United States Patent
Okada et al.

(10) Patent No.: US 12,041,354 B2
(45) Date of Patent: Jul. 16, 2024

(54) DRIVE APPARATUS

(71) Applicant: Asahi Kasei Microdevices Corporation, Tokyo (JP)

(72) Inventors: Keita Okada, Tokyo (JP); Takahito Hara, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 89 days.

(21) Appl. No.: 17/892,176

(22) Filed: Aug. 22, 2022

(65) Prior Publication Data
US 2023/0079571 A1 Mar. 16, 2023

(30) Foreign Application Priority Data
Sep. 13, 2021 (JP) ................................ 2021-148442

(51) Int. Cl.
*H04N 23/68* (2023.01)
*H04N 23/54* (2023.01)
*H04N 23/57* (2023.01)

(52) U.S. Cl.
CPC .......... *H04N 23/687* (2023.01); *H04N 23/54* (2023.01); *H04N 23/57* (2023.01)

(58) Field of Classification Search
CPC ...... H04N 23/687; H04N 23/54; H04N 23/57; H04N 23/60; H04N 23/69
See application file for complete search history.

(56) References Cited

U.S. PATENT DOCUMENTS

| | | | |
|---|---|---|---|
| 10,749,452 B2 | 8/2020 | Kaidu | |
| 11,039,071 B2 | 6/2021 | Min | |
| 2009/0085558 A1 | 4/2009 | David | |
| 2011/0291603 A1 | 12/2011 | Kura | |
| 2012/0191889 A1* | 7/2012 | Fischer | G06F 13/4291 710/110 |
| 2015/0130388 A1 | 5/2015 | Fukushima | |
| 2015/0350507 A1* | 12/2015 | Topliss | H04N 23/687 348/208.2 |
| 2016/0033739 A1* | 2/2016 | Topliss | G02B 13/009 359/696 |
| 2016/0295099 A1 | 10/2016 | Kasamatsu | |

(Continued)

FOREIGN PATENT DOCUMENTS

| | | |
|---|---|---|
| JP | H0564487 A | 3/1993 |
| JP | H09191680 A | 7/1997 |
| JP | 2005049729 A | 2/2005 |

(Continued)

*Primary Examiner* — Christopher K Peterson

(57) ABSTRACT

Provided is a drive apparatus including: a first drive unit group including first drive units, each for generating a magnetic field to drive a first object provided with a first lens and magnet in an optical axis direction; and a second drive unit group including second drive units, each for generating a magnetic field to drive a second object provided with a second lens and magnet in the direction. Each of the first and second drive units includes a first and second terminal connected via a clock and data signal line to a master controlling the drive unit as a slave. In at least one of the first drive units, the first and second terminals are respectively forward-connected to the clock and data signal lines. In at least one of the second drive units, the second and first terminals are respectively reverse-connected to the clock and data signal lines.

20 Claims, 13 Drawing Sheets

(56) References Cited

U.S. PATENT DOCUMENTS

2018/0109207 A1   4/2018   Oka

FOREIGN PATENT DOCUMENTS

| | | |
|---|---|---|
| JP | 2007124799 A | 5/2007 |
| JP | 2008035130 A | 2/2008 |
| JP | 2013011749 A | 1/2013 |
| JP | 2013099139 A | 5/2013 |
| JP | 2013238821 A | 11/2013 |
| JP | 5731950 B2 | 6/2015 |
| JP | 2017097787 A | 6/2017 |
| JP | 6644529 B2 | 2/2020 |

* cited by examiner

| INDEX | SECTION | DRIVE UNIT IN CHARGE | APPLICATION DIRECTION |
|---|---|---|---|
| 0 | 0-1mm | 100a | FORWARD |
| 1 | 1-2mm | 100b | REVERSE |
| 2 | 2-3mm | 100a | REVERSE |
| 3 | 3-4mm | 100b | FORWARD |
| 4 | 4-5mm | 100c | REVERSE |
| 5 | 5-6mm | 100b | REVERSE |
| 6 | 6-7mm | 100c | FORWARD |
| 7 | 7-8mm | 100d | REVERSE |
| 8 | 8-9mm | 100c | REVERSE |
| 9 | 9-10mm | 100d | FORWARD |

*FIG.9*

DRIVE APPARATUS

The contents of the following Japanese patent application(s) are incorporated herein by reference:
NO. 2021-148442 filed in JP on Sep. 13, 2021

BACKGROUND

1. Technical Field

The present invention relates to a drive apparatus.

2. Related Art

Patent Document 1 describes that "a motor drive system 1 includes a first motor drive control apparatus 50a, a second motor drive control apparatus 50b, a control unit 2a, and a switch unit 6 capable of switching, between a valid state and an invalid state, a first communication line 4a for connecting a common terminal 2b of the control unit 2a and the first motor drive control apparatus 50a and a second communication line 4b for connecting the common terminal 2b and the second motor drive control apparatus 50b".

CITATION LIST

Patent Document

Patent Document 1: U.S. patent Ser. No. 10/749,452
Patent Document 2: Japanese patent No. 6644529
Patent Document 3: U.S. patent Ser. No. 11/039,071

SUMMARY

In a first aspect of the present invention, a drive apparatus is provided. The drive apparatus may include a first drive unit group including a first plurality of drive units, each of which is configured to generate a magnetic field to drive a first object provided with a first lens and a first magnet in an optical axis direction. The drive apparatus may include a second drive unit group including a second plurality of drive units, each of which is configured to generate a magnetic field to drive a second object provided with a second lens and a second magnet in the optical axis direction. Each of the first plurality of drive units and the second plurality of drive units may include a first terminal and a second terminal that are connected via a clock signal line and a data signal line to a master that controls the drive unit as a slave. In at least one drive unit in the first plurality of drive units, the first terminal may be forward-connected to the clock signal line, and the second terminal may be forward-connected to the data signal line. In at least one drive unit in the second plurality of drive units, the second terminal may be reverse-connected to the clock signal line, and the first terminal may be reverse-connected to the data signal line.

Each of the first plurality of drive units and the second plurality of drive units may be slave-connected to a host that is configured to function as a common controller configured to control the first drive unit group and the second drive unit group.

Each of all drive units in the first plurality of drive units may be connected to the host such that the first terminal is forward-connected to the clock signal line, and the second terminal is forward-connected to the data signal line. Each of all drive units in the second plurality of drive units may be connected to the host such that the second terminal is reverse-connected to the clock signal line, and the first terminal is reverse-connected to the data signal line.

The drive apparatus may further include the host.

A first drive unit in the first plurality of drive units and a second drive unit in the second plurality of drive units may be slave-connected to a host. Other drive units in the first plurality of drive units may be slave-connected to the first drive unit. Other drive units in the second plurality of drive units may be slave-connected to the second drive unit.

The first drive unit may be connected to the host such that the first terminal is forward-connected to a primary clock signal line, and the second terminal is forward-connected to a primary data signal line. The second drive unit may be connected to the host such that the second terminal is reverse-connected to the primary clock signal line, and the first terminal is reverse-connected to the primary data signal line.

At least one of the other drive units in the first plurality of drive units may be connected to the first drive unit such that the first terminal is forward-connected to a secondary first clock signal line, and the second terminal is forward-connected to a secondary first data signal line. At least one of the other drive units in the first plurality of drive units may be connected to the first drive unit such that the second terminal is reverse-connected to the secondary first clock signal line, and the first terminal is reverse-connected to the secondary first data signal line.

At least one of the other drive units in the second plurality of drive units may be connected to the second drive unit such that the first terminal is forward-connected to a secondary second clock signal line, and the second terminal is forward-connected to a secondary second data signal line. At least one of the other drive units in the second plurality of drive units may be connected to the second drive unit such that the second terminal is reverse-connected to the secondary second clock signal line, and the first terminal is reverse-connected to the secondary second data signal line.

The first drive unit and the second drive unit may be configured to function as individual controllers that respectively control the drive unit groups to which the first drive unit and the second drive unit belong.

A first drive unit in the first plurality of drive units may be slave-connected to a host. Other drive units in the first plurality of drive units and the second plurality of drive units may be slave-connected to the first drive unit.

Each of all other drive units in the first plurality of drive units may be connected to the first drive unit such that the first terminal is forward-connected to a secondary clock signal line, and the second terminal is forward-connected to a secondary data signal line. Each of all drive units in the second plurality of drive units may be connected to the first drive unit such that the second terminal is reverse-connected to the secondary clock signal line, and the first terminal is reverse-connected to the secondary data signal line.

The first drive unit may be configured to function as a common controller that controls the first drive unit group and the second drive unit group.

The at least one reverse-connected drive unit may be configured to be communicable as a slave different from the at least one forward-connected drive unit as viewed from the master.

The at least one reverse-connected drive unit may be configured to discriminate between a clock signal and a data signal and switch between an internal clock signal line and an internal data signal line.

The at least one reverse-connected drive unit may be configured to change its own slave address in accordance with switching between the internal clock signal line and the internal data signal line.

Each of the first plurality of drive units and the second plurality of drive units may be configured to be able to discriminate between the clock signal and the data signal and switch between the internal clock signal line and the internal data signal line.

Each of the first plurality of drive units may be configured to drive the first object by feedback control based on a target position command signal of the first object and a detection position signal of the first object. Each of the second plurality of drive units may be configured to drive the second object by feedback control based on a target position command signal of the second object and a detection position signal of the second object.

Each of the first plurality of drive units may include at least one magnetic sensor element configured to detect a magnetic field generated by the first magnet. Each of the second plurality of drive units may include at least one magnetic sensor element configured to detect a magnetic field generated by the second magnet.

The controller may be configured to control at least either of the first drive unit group or the second drive unit group to drive at least either of the first object or the second object to a target position in the optical axis direction.

When driving at least either of the first object or the second object to the target position, the controller may be configured to set a plurality of via points obtained by dividing a path to the target position, and execute the driving to each via point in the plurality of via points in a stepwise manner.

When the target position is changed, the controller may be configured to drive at least either of the first object or the second object from a via point immediately after the change in the plurality of via points to the changed target position.

The controller may be configured to be able to switch whether to execute the driving in a stepwise manner in accordance with an operation state of a system including the object.

The summary clause does not necessarily describe all necessary features of the embodiments of the present invention. The present invention may also be a sub-combination of the features described above.

BRIEF DESCRIPTION OF THE DRAWINGS

FIG. 9 illustrates an example of assignment of the drive unit 100 in charge of each of a plurality of sections.

DESCRIPTION OF EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
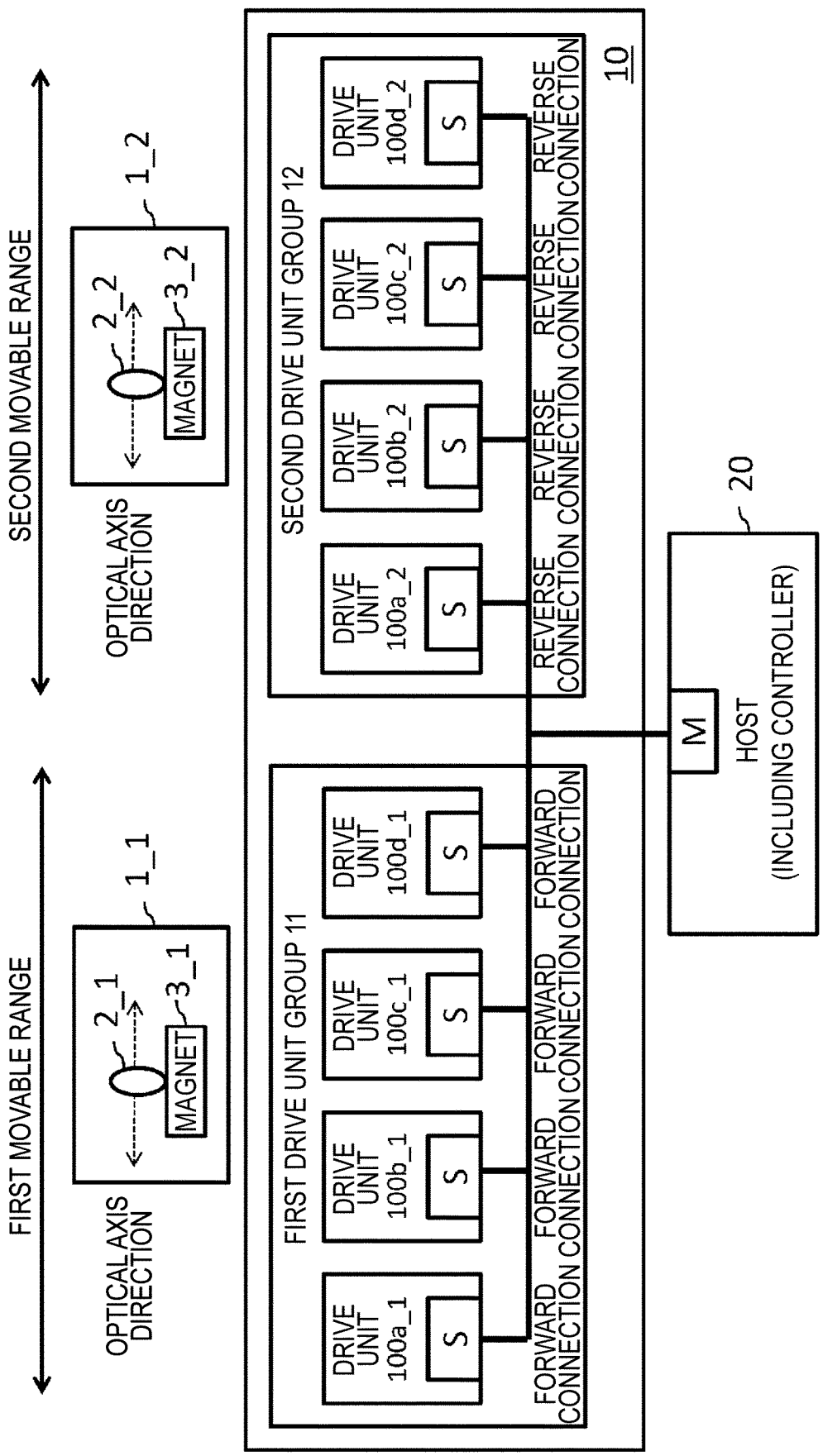
FIG. 1 illustrates an example of a block diagram of a drive apparatus 10 according to a first embodiment together with an object 1 and a host 20.

FIG. 1 illustrates an example of a block diagram of a drive apparatus 10 according to a first embodiment together with an object 1 and a host 20. Note that these blocks are functional blocks which are functionally separated from each other, and may not necessarily coincide with an actual device configuration. That is, in the present drawing, even though the block is illustrated as one block, the block may not necessarily be configured by one device. In addition, in the present drawing, even if the blocks are illustrated as separate blocks, the blocks may not necessarily be configured by separate devices. The same applies to other drawings.

The drive apparatus 10 according to the present embodiment includes a first drive unit group that drives a first object and a second drive unit group that drives a second object. Then, in the drive apparatus 10 according to the present embodiment, a clock signal line and a data signal line are forward-connected in at least one drive unit in the first drive unit group, while the clock signal line and the data signal line are reverse-connected in at least one drive unit in the second drive unit group.

The drive apparatus 10 drives a plurality of driving targets. In the present drawing, as an example, a case is illustrated in which the drive apparatus 10 sets two of a first object 1_1 and a second object 1_2 (collectively referred to as "object(s) 1") as driving targets. However, the present invention is not limited thereto. The drive apparatus 10 may drive three or more driving targets.

The object 1 is a device of which the position changes in accordance with an input signal. As an example, the object 1 may be a linear motion device. In the linear motion device, an input signal and a displacement corresponding to the input signal are expressed by a linear function. Examples of such a linear motion device include an autofocus/zoom lens of a camera or the like. Hereinafter, a case where the object 1 is an autofocus/zoom lens of a camera will be described as an example. However, the present invention is not limited thereto. The object 1 may be various devices of which the positions can change in accordance with the input signal.

The object 1 is provided with a pair of lens 2 and magnet 3. That is, the first object 1_1 is provided with a first lens 2_1 and a first magnet 3_1. Similarly, the second object 1_2 is provided with a second lens 2_2 and a second magnet 3_2. Here, the first lens 2_1 and the second lens 2_2 are collectively referred to as the "lens 2". In addition, the first magnet 3_1 and the second magnet 3_2 are collectively referred to as the "magnet 3".

The lens 2 is an optical element for refracting and focusing light. In autofocus/zoom control, such a lens 2 is displaced in an optical axis direction to change focusing and magnification.

The magnet 3 is a permanent magnet fixed to the lens 2. As an example, in the magnet 3, S poles and N poles may be alternately disposed along the optical axis direction of lens 2. Then, a current flows through a drive coil described below, so that the magnet 3 generates a magnetic force between the magnet and the drive coil and displaces the lens 2 in the optical axis direction. The drive apparatus 10 according to the present embodiment sets such a plurality of objects 1 as the driving targets.

The drive apparatus 10 includes a plurality of drive unit groups that respectively drive a plurality of driving targets. In the present drawing, a case where the drive apparatus 10 includes a first drive unit group 11 that drives the first object 1_1 and a second drive unit group 12 that drives the second object 1_2 is illustrated as an example. However, the present invention is not limited thereto. The drive apparatus 10 may include three or more drive unit groups in accordance with the number of the objects 1 as the driving targets.

The first drive unit group 11 drives the first object 1_1 within a first movable range. Such a first movable range may be a predetermined range for allowing movement of the first object 1_1 in the optical axis direction of the first lens 2_1. The first drive unit group 11 includes a first first drive unit 100a_1, a first second drive unit 100b_1, a first third drive unit 100c_1, and a first fourth drive unit 100d_1 (collectively referred to as a "first plurality of drive units 1001"), each of which generates a magnetic field to drive the first object 1_1 provided with the first lens 2_1 and the first magnet 3_1 in the optical axis direction. The first plurality of drive units 100_1 is disposed along the optical axis direction of the first lens 2_1. In such a first plurality of drive units 100_1, one drive unit that drives the first object 1_1 is assigned in advance to be in charge of each of a plurality of sections obtained by dividing the first movable range. Then, each drive unit drives the first object 11 in the section of which the drive unit is in charge, whereby the first plurality of drive units 100_1 cooperatively drives the first object 1_1 over the first movable range. In the present drawing, a case where the first drive unit group 11 includes four drive units is illustrated as an example, but the present invention is not limited thereto. The first drive unit group 11 may include two, three, or more than four drive units.

Similarly, the second drive unit group 12 drives the second object 1_2 within a second movable range. Such a second movable range may be a predetermined range for allowing movement of the second object 1_2 in the optical axis direction of the second lens 2_2. Note that the optical axis direction of the first lens 2_1 and the optical axis direction of the second lens 2_2 may be the same direction. In addition, at least a part of the second movable range may overlap with at least a part of the first movable range. The second drive unit group 12 includes a second first drive unit 100a_2, a second second drive unit 100b_2, a second third drive unit 100c_2, and a second fourth drive unit 100d_2 (the units are collectively referred to as a "second plurality of drive units 100_2", and the first plurality of drive units 100_1 and the second plurality of drive units 100_2 are collectively referred to as "drive unit(s) 100"), each of which generates a magnetic field to drive the second object 1_2 provided with the second lens 2_2 and the second magnet 32 in the optical axis direction. The second plurality of drive units 1002 is disposed along the optical axis direction of the second lens 2_2. In such a second plurality of drive units 100_2, one drive unit that drives the second object 1_2 is assigned in advance to be in charge of each of a plurality of sections obtained by dividing the second movable range. Then, each drive unit drives the second object 1_2 in the section of which the drive unit is in charge, whereby the second plurality of drive units 100_2 cooperatively drives the second object 1_2 over the second movable range. Note that similarly to the first drive unit group 11, the second drive unit group 12 may include two, three, or more than four drive units. Note that details of the drive unit 100 will be described below.

The host 20 is a high-order control apparatus that controls the drive apparatus 10. In the first embodiment, the host 20 functions as a common controller that controls the first drive unit group 11 and the second drive unit group 12. That is, the host 20 may include an autofocus/zoom controller. In the first embodiment, each of the first plurality of drive units 100_1 and the second plurality of drive units 100_2 is slave-connected to such a host 20 that functions as the common controller that controls the first drive unit group 11 and the second drive unit group 12. Note that such a controller may include, for example, a drive algorithm for driving each drive unit 100 to move each object 1 to a target position and an algorithm for grasping the position (that is, the position of each magnet 3) of each object 1. At this time, the controller may hold, in an internal memory, magnetic field information or the like necessary for the algorithm.

Figure 2:
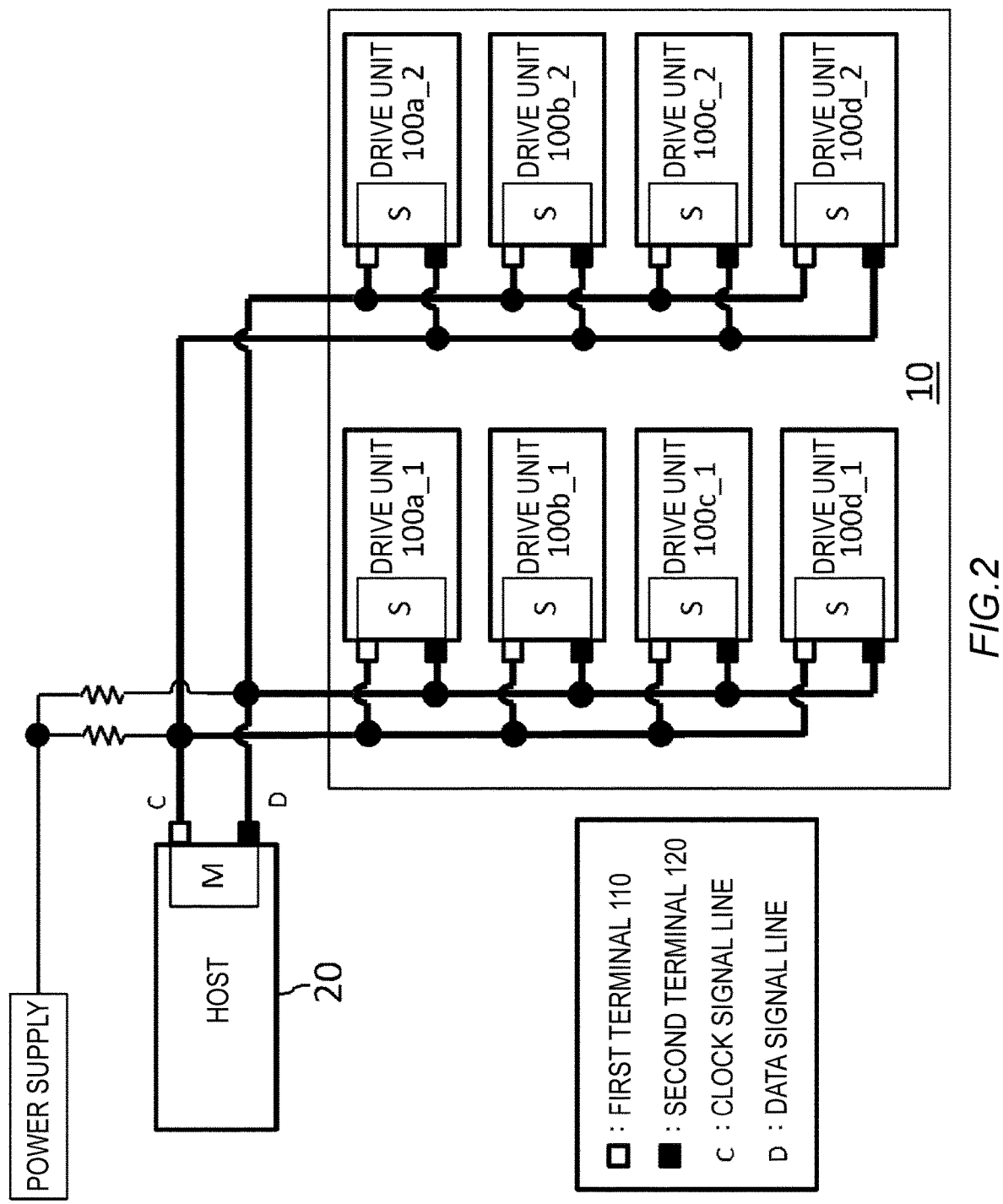
FIG. 2 illustrates an example of a wiring diagram of the drive apparatus 10 according to the first embodiment together with the host 20.

FIG. 2 illustrates an example of a wiring diagram of the drive apparatus 10 according to the first embodiment together with the host 20. The host 20 and the drive apparatus 10 are connected by a serial communication method such as an inter-integrated circuit (I2C), for example. In the I2C, generally, one master and one or more slaves are connected in a party line shape by two signal lines of a clock signal line SCL and a data signal line SDA. In addition, each slave has an address, and only one slave designated by the address included in the data communicates with the master on a one-to-one basis.

In the present drawing, a white terminal is a first terminal 110. The first terminal 110 may be, for example, an SCL port in the I2C. In addition, in the present drawing, a black terminal is a second terminal 120. The second terminal 120 may be, for example, an SDA port in the I2C. As illustrated in the present drawing, each of the first plurality of drive units 100_1 and the second plurality of drive units 100_2 includes a first terminal 110 and a second terminal 120 connected via a clock signal line and a data signal line to a master that controls the unit as a slave.

In the present drawing, a signal line denoted by a sign C indicates the clock signal line SCL. In addition, in the present drawing, a signal line denoted by a sign D indicates the data signal line SDA. The clock signal line SCL and the data signal line SDA are connected to a power supply via a pull-up resistor.

Then, in the drive apparatus 10 according to the first embodiment, all the drive units 100a_1 to 100d_1 in the first plurality of drive units 100_1 are connected to the host 20 such that the first terminals 110 are forward-connected to the clock signal line SCL, and the second terminals 120 are forward-connected to the data signal line SDA. That is, the first plurality of drive units 100_1 is connected to the host 20 by normal wiring in the I2C.

On the other hand, all the drive units 100a_2 to 100d_2 in the second plurality of drive units 100_2 are connected to the host 20 such that the second terminals 120 are reverse-connected to the clock signal line SCL, and the first terminals 110 are reverse-connected to the data signal line SDA. That is, the second plurality of drive units 100_2 is connected to the host 20 by wiring reverse to the normal wiring in the I2C.

In the above description, a case where, in the connection to the host 20, all the drive units 100a_1 to 100d_1 in the first plurality of drive units 100_1 are forward-connected, and all the drive units 100a_2 to 100d_2 in the second plurality of drive units 100_2 are reverse-connected has been described as an example, but the present invention is not limited thereto. For example, in the first drive unit group 11, the first first drive unit 100a_1 and the first third drive unit 100c_1 may be forward-connected, and the first second drive unit 100b_1 and the first fourth drive unit 100d_1 may be reverse-connected. In the second drive unit group 12, the second second drive unit 100b_2 and the second fourth drive unit 100d_2 may be forward-connected, and the second first drive unit 100a_2 and the second third drive unit 100c_2 may be reverse-connected. In this way, the forward connection and the reverse connection may be mixed in the drive unit group.

In the drive apparatus 10 according to the first embodiment, for example, when wiring is made in this way, in at least one drive unit in the first plurality of drive units 100_1, the first terminal 110 may be forward-connected to the clock signal line SCL, and the second terminal 120 may be forward-connected to the data signal line SDA, and in at least one drive unit in the second plurality of drive units 100_2, the second terminal 120 may be reverse-connected to the clock signal line SCL, and the first terminal 110 may be reverse-connected to the data signal line SDA.

In the above description, a case where the drive apparatus 10 and the host 20 are configured as separate apparatuses has been described as an example, but the present invention is not limited thereto. The drive apparatus 10 and the host 20 may be configured as an integrated apparatus. That is, the drive apparatus 10 may further include the host 20.

Figure 3:
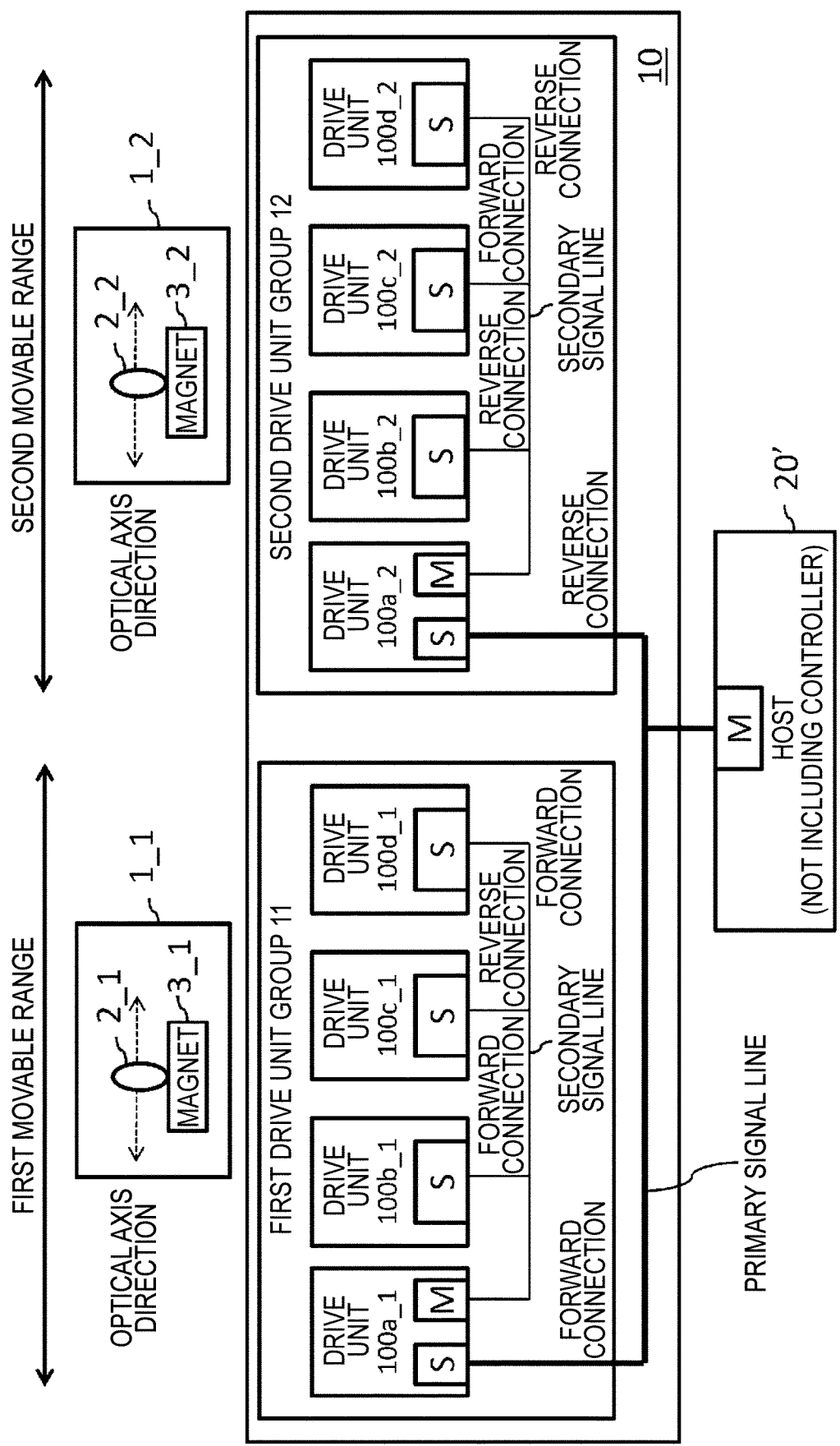
FIG. 3 illustrates an example of a block diagram of the drive apparatus 10 according to a second embodiment together with the object 1 and a host 20'.

FIG. 3 illustrates an example of a block diagram of the drive apparatus 10 according to a second embodiment together with the object 1 and a host 20'. In FIG. 3, members having the same functions and configurations as those in FIG. 1 are denoted by the same signs, and description thereof will be omitted except for following differences. In the first embodiment, a case where the host 20 functions as the common controller that controls the first drive unit group 11 and the second drive unit group 12 has been described as an example. However, in the second embodiment, the host 20' does not have a function as the controller that controls the first drive unit group 11 and the second drive unit group 12. That is, the host 20' does not include an autofocus/zoom controller. Examples of such a host 20' include an image signal processor (ISP) or the like. The ISP is an image processing processor in a camera system.

In the second embodiment, a first drive unit in the first plurality of drive units 100_1 and a second drive unit in the second plurality of drive units 100_2 are slave-connected to the host 20' via a primary signal line. Note that in the present drawing, a case where the first first drive unit 100a_1 is the "first drive unit", and the second first drive unit 100a_2 is the "second drive unit" is illustrated as an example. Then, the other drive units in the first plurality of drive units 100_1 are slave-connected to the first drive unit via a secondary signal line, and the other drive units in the second plurality of drive units 100_2 are slave-connected to the second drive unit via a secondary signal line. In the second embodiment, the first drive unit and the second drive unit function as individual controllers that respectively control the drive unit groups to which the first drive unit and the second drive unit belong. As a result, in the second embodiment, it is not necessary to separately provide a controller alone.

Figure 4:
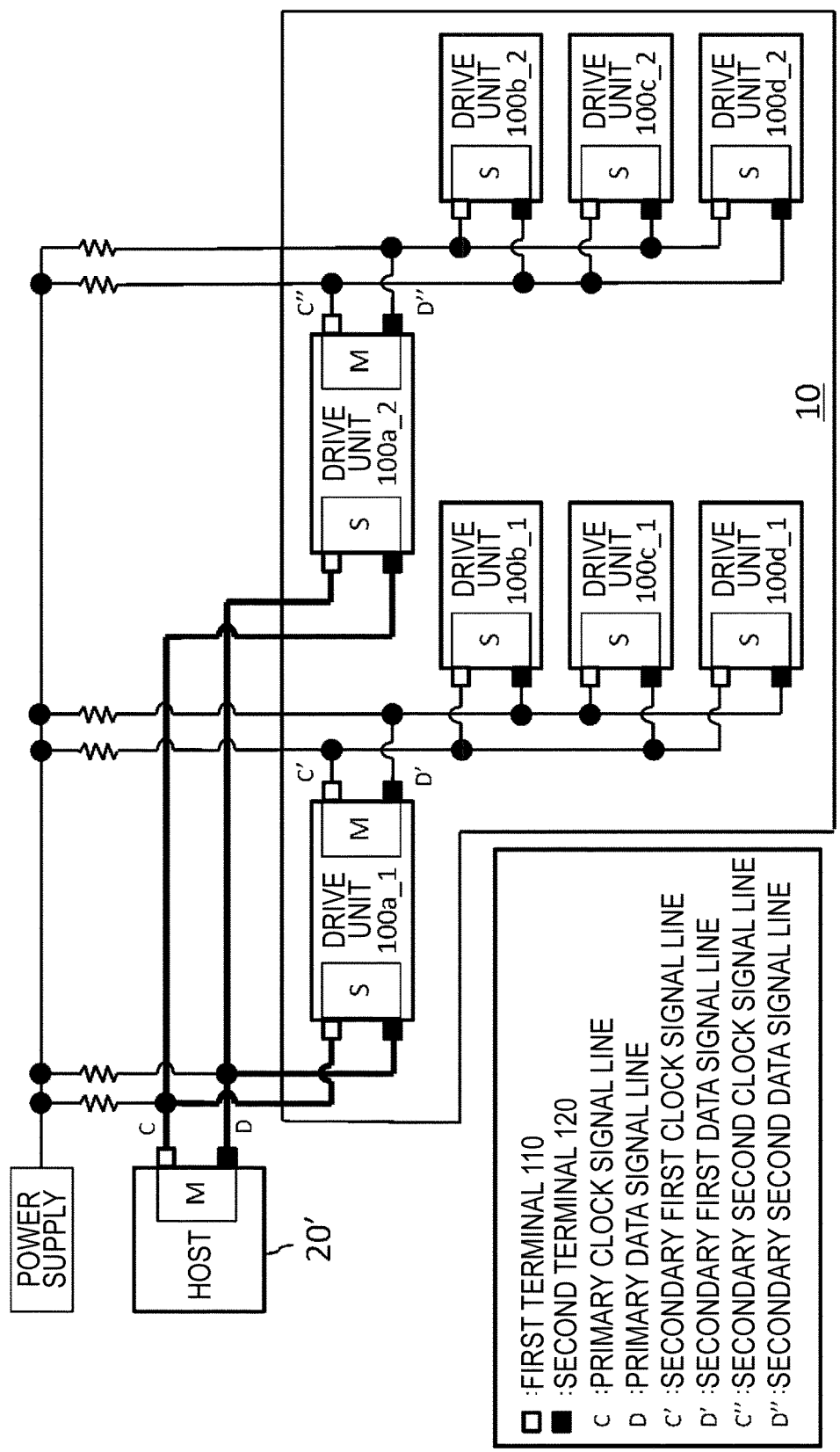
FIG. 4 illustrates an example of a wiring diagram of the drive apparatus 10 according to the second embodiment together with the host 20'.

FIG. 4 illustrates an example of a wiring diagram of the drive apparatus 10 according to the second embodiment together with the host 20'. In FIG. 4, members having the same functions and configurations as those in FIG. 2 are denoted by the same signs, and description thereof will be omitted except for following differences. In the present drawing, a signal line denoted by a sign C indicates a primary clock signal line SCL. In addition, in the present drawing, a signal line denoted by a sign D indicates a primary data signal line SDA. The primary clock signal line SCL and the primary data signal line SDA are connected to the power supply via a pull-up resistor.

In the present drawing, a signal line denoted by a sign C' indicates a secondary first clock signal line SCL'. In addition, in the present drawing, a signal line denoted by a sign D' indicates a secondary first data signal line SDA'. The secondary first clock signal line SCL' and the secondary first data signal line SDA' are also connected to the power supply via a pull-up resistor.

In the present drawing, a signal line denoted by a sign C" indicates a secondary second clock signal line SCL". In addition, in the present drawing, a signal line denoted by a sign D" indicates a secondary second data signal line SDA". The secondary second clock signal line SCL" and the secondary second data signal line SDA" are also connected to the power supply via a pull-up resistor. Here, when it is not particularly necessary to distinguish, the primary clock signal line SCL, the secondary first clock signal line SCL', and the secondary second clock signal line SCL" are collectively referred to as a "clock signal line SCL". Similarly, the primary data signal line SDA, the secondary first data signal line SDA', and the secondary second data signal line SDA" are collectively referred to as a "data signal line SDA".

In the present drawing, a case where all the signal lines are connected to the common power supply via the pull-up resistors is illustrated as an example, but the present invention is not limited thereto. At least any one of the signal lines may be connected to a different power supply via a pull-up resistor. In addition, in the present drawing, a case where all the signal lines are connected to the power supply via the individual pull-up resistors has been illustrated as an example, but the present invention is not limited thereto. The pull-up resistor may be shared by at least any two of the signal lines.

First, attention is paid to the primary connection to the host 20'. The first first drive unit 100a_1 which is the first drive unit is connected to the host 20' such that the first terminal 110 is forward-connected to the primary clock signal line SCL, and the second terminal 120 is forward-connected to the primary data signal line SDA. In addition, the second first drive unit 100a_2 which is the second drive unit is connected to the host 20' such that the second terminal 120 is reverse-connected to the primary clock signal line SCL, and the first terminal 110 is reverse-connected to the primary data signal line SDA.

In the second embodiment, the first first drive unit 100*a*1 primarily connected to the host 20' functions as a controller that controls the first drive unit group 11. That is, the first first drive unit 100*a*_1 also functions as the drive unit 100 and the controller. Similarly, the second first drive unit 100*a*_2 primarily connected to the host 20' functions as a controller that controls the second drive unit group 12. That is, the second first drive unit 100*a*_2 also functions as the drive unit 100 and the controller.

Next, attention is paid to the secondary connection to the controller. The first second drive unit 100*b*_1 is connected to the first first drive unit 100*a*_1 such that the first terminal 110 is forward-connected to the secondary first clock signal line SCL', and the second terminal 120 is forward-connected to the secondary first data signal line SDA'. In addition, the first third drive unit 100*c*_1 is connected to the first first drive unit 100*a*_1 such that the second terminal 120 is reverse-connected to the secondary first clock signal line SCL', and the first terminal 110 is reverse-connected to the secondary first data signal line SDA'. In addition, the first fourth drive unit 100*d*_1 is connected to the first first drive unit 100*a*_1 such that the first terminal 110 is forward-connected to the secondary first clock signal line SCL', and the second terminal 120 is forward-connected to the secondary first data signal line SDA'. In this way, at least one of the other drive units 100*b*_1 to 100*d*_1 in the first plurality of drive units 100_1 may be connected to the first drive unit (first first drive unit 100*a*1) such that the first terminal 110 is forward-connected to the secondary first clock signal line SCL', and the second terminal 120 is forward-connected to the secondary first data signal line SDA'. In addition, at least one of the other drive units 100*b*_1 to 100*d*_1 in the first plurality of drive units 100_1 may be connected to the first drive unit (first first drive unit 100*a*_1) such that the second terminal 120 is reverse-connected to the secondary first clock signal line SCL', and the first terminal 110 is reverse-connected to the secondary first data signal line SDA'.

Similarly, the second second drive unit 100*b*_2 is connected to the second first drive unit 100*a*_2 such that the second terminal 120 is reverse-connected to the secondary second clock signal line SCL", and the first terminal 110 is reverse-connected to the secondary second data signal line SDA". In addition, the second third drive unit 100*c*_2 is connected to the second first drive unit 100*a*_2 such that the first terminal 110 is forward-connected to the secondary second clock signal line SCL", and the second terminal 120 is forward-connected to the secondary second data signal line SDA". In addition, the second fourth drive unit 100*d*_2 is connected to the second first drive unit 100*a*_2 such that the second terminal 120 is reverse-connected to the secondary second clock signal line SCL", and the first terminal 110 is reverse-connected to the secondary second data signal line SDA". In this way, at least one of the other drive units 100*b*_2 to 100*d*_2 in the second plurality of drive units 100_2 may be connected to the second drive unit (second first drive unit 100*a*_2) such that the first terminal 110 is forward-connected to the secondary second clock signal line SCL", and the second terminal 120 is forward-connected to the secondary second data signal line SDA". In addition, at least one of the other drive units 100*b*_2 to 100*d*_2 in the second plurality of drive units 100_2 may be connected to the second drive unit (second first drive unit 100*a*_2) such that the second terminal 120 is reverse-connected to the secondary second clock signal line SCL", and the first terminal 110 is reverse-connected to the secondary second data signal line SDA".

In the above description, a case where the forward connection and the reverse connection are mixed in the drive unit group in the secondary connection to the controller has been described as an example, but the present invention is not limited thereto. In the secondary connection to the controller, all the other drive units in the drive unit group may be forward-connected, or all the other drive units in the drive unit group may be reverse-connected.

In the drive apparatus 10 according to the second embodiment, for example, when wiring is made in this way, in at least one drive unit in the first plurality of drive units 100_1, the first terminal 110 may be forward-connected to the clock signal line SCL, and the second terminal 120 may be forward-connected to the data signal line SDA, and in at least one drive unit in the second plurality of drive units 100_2, the second terminal 120 may be reverse-connected to the clock signal line SCL, and the first terminal 110 may be reverse-connected to the data signal line SDA.

Figure 5:
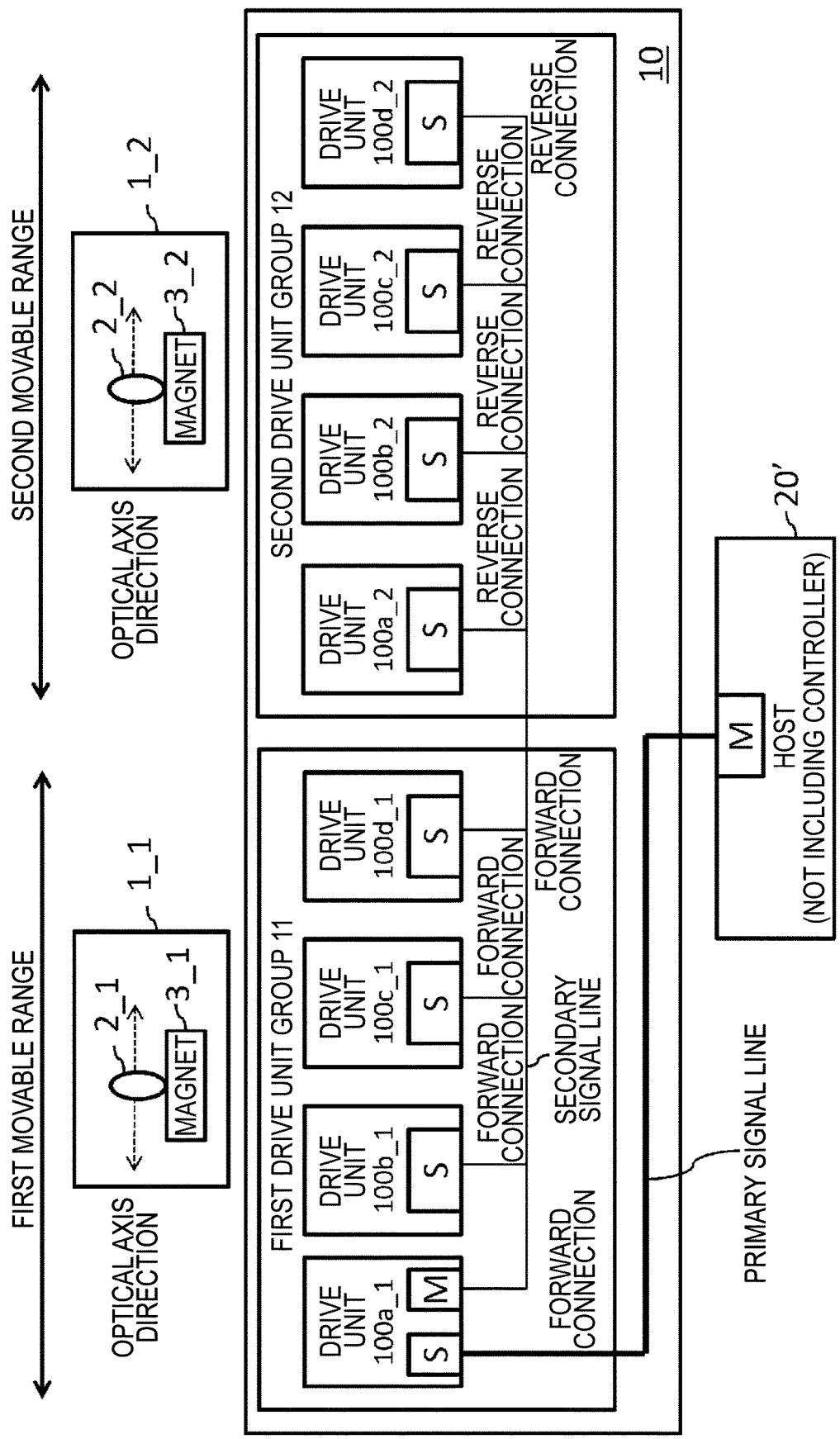
FIG. 5 illustrates an example of a block diagram of a drive apparatus 10 according to a third embodiment together with the object 1 and the host 20'.

FIG. 5 illustrates an example of a block diagram of the drive apparatus 10 according to the third embodiment together with the object 1 and the host 20'. In FIG. 5, members having the same functions and configurations as those in FIG. 3 are denoted by the same signs, and description thereof will be omitted except for following differences. In the second embodiment, a case where the first drive unit and the second drive unit function as individual controllers that respectively control the drive unit groups to which the first drive unit and the second drive unit belong has been described as an example. However, in the third embodiment, the first drive unit functions as the common controller that controls the first drive unit group 11 and the second drive unit group 12.

In the third embodiment, the first drive unit in the first plurality of drive units 100_1 is slave-connected to the host 20' via the primary signal line. Note that in the present drawing, a case where the first first drive unit 100*a*_1 is the "first drive unit" is illustrated as an example. Then, the other drive units in the first plurality of drive units 100_1 and the second plurality of drive units 100_2 are slave-connected to the first drive unit via the secondary signal line. In the third embodiment, the first drive unit functions as the common controller that controls the first drive unit group 11 and the second drive unit group 12. As a result, in the third embodiment, the controller can be shared by the first drive unit group 11 and the second drive unit group 12.

Figure 6:
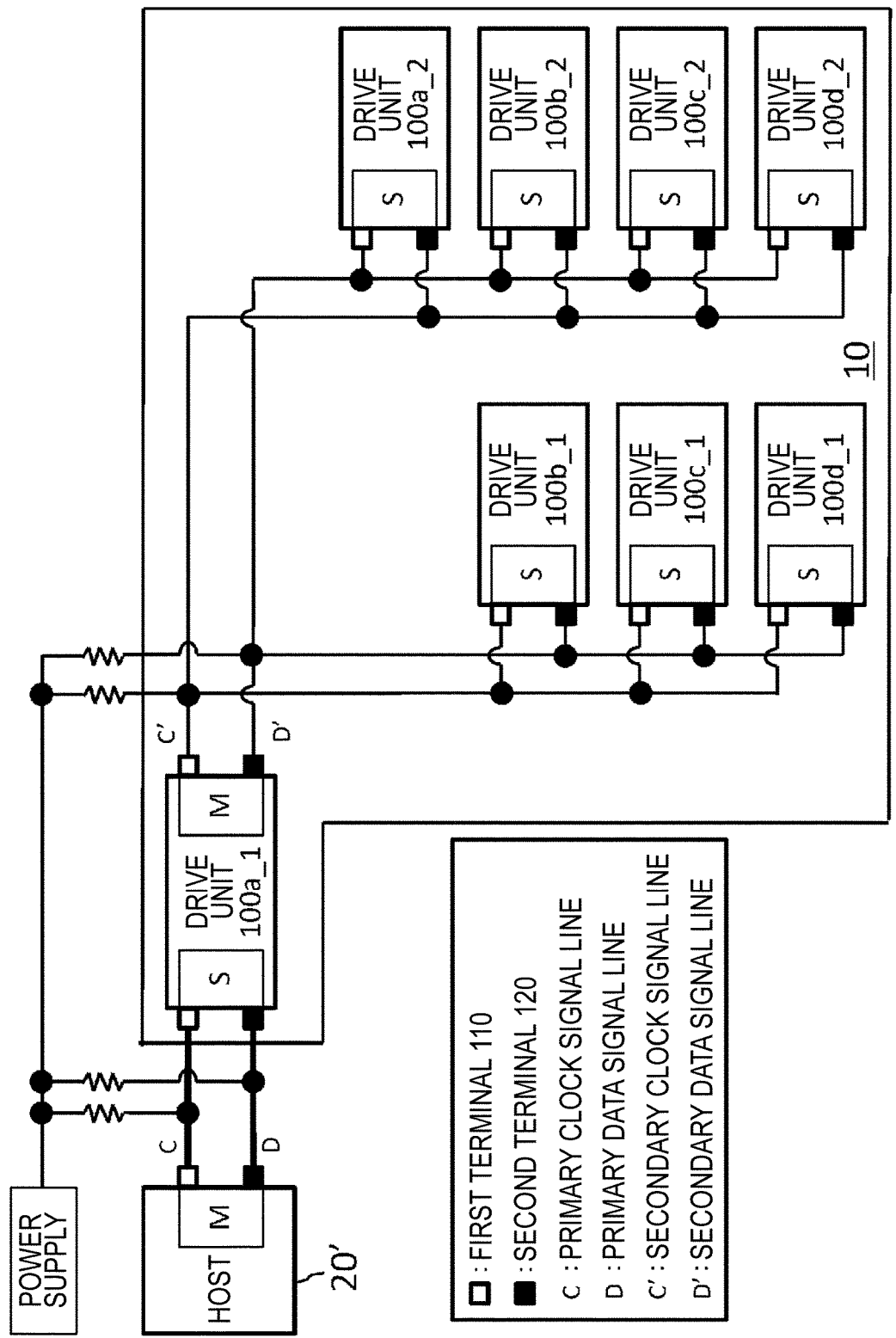
FIG. 6 illustrates an example of a wiring diagram of the drive apparatus 10 according to the third embodiment together with the host 20'.

FIG. 6 illustrates an example of a wiring diagram of the drive apparatus 10 according to the third embodiment together with the host 20'. In FIG. 6, members having the same functions and configurations as those in FIG. 4 are denoted by the same signs, and description thereof will be omitted except for following differences. In the present drawing, a signal line denoted by a sign C indicates a primary clock signal line SCL. In addition, in the present drawing, a signal line denoted by a sign D indicates a primary data signal line SDA. The primary clock signal line SCL and the primary data signal line SDA are connected to the power supply via a pull-up resistor.

In the present drawing, a signal line denoted by a sign C' indicates a secondary clock signal line SCL'. In addition, in the present drawing, a signal line denoted by a sign D' indicates a secondary data signal line SDA'. The secondary clock signal line SCL' and the secondary data signal line SDA' are also connected to the power supply via a pull-up resistor. Here, when it is not particularly necessary to distinguish, the primary clock signal line SCL and the secondary clock signal line SCL' are collectively referred to as the "clock signal line SCL". Similarly, the primary data signal line SDA and the secondary data signal line SDA' are collectively referred to as the "data signal line SDA".

Also in the third embodiment, similarly to the second embodiment, at least any one of the signal lines may be connected to a different power supply via a pull-up resistor. In addition, the pull-up resistor may be shared by at least any two of the signal lines.

First, attention is paid to the primary connection to the host 20'. The first first drive unit 100a_1 which is the first drive unit is connected to the host 20' such that the first terminal 110 is forward-connected to the primary clock signal line SCL, and the second terminal 120 is forward-connected to the primary data signal line SDA.

In the third embodiment, the first first drive unit 100a_1 primarily connected to the host 20' functions as the common controller that controls the first drive unit group 11 and the second drive unit group 12. That is, the first first drive unit 100a_1 also functions as the drive unit 100 and the controller.

Next, attention is paid to the secondary connection to the controller. The first second drive unit 100b_1, the first third drive unit 100c_1, and the first fourth drive unit 100d_1 are connected to the first first drive unit 100a_1 such that the first terminals 110 are forward-connected to the secondary clock signal line SCL', and the second terminals 120 are forward-connected to the secondary data signal line SDA'. In this way, all the other drive units 100b_1 to 100d_1 in the first plurality of drive units 100_1 may be connected to the first drive unit (first first drive unit 100a1) such that the first terminals 110 are forward-connected to the secondary clock signal line SCL', and the second terminals 120 are forward-connected to the secondary data signal line SDA'.

In the second first drive unit 100a_2, the second second drive unit 100b_2, the second third drive unit 100c_2, and the second fourth drive unit 100d_2, the second terminals 120 are connected to the secondary clock signal line SCL', and the first terminals 110 are connected to the secondary data signal line SDA'. In this way, all the drive units 100a_2 to 100d_2 in the second plurality of drive units 100_2 may be connected to the first drive unit (first first drive unit 100a1) such that the second terminals 120 are reverse-connected to the secondary clock signal line SCL', and the first terminal 110 are reverse-connected to the secondary data signal line SDA'.

In the above description, a case where, in the secondary connection to the controller, all the other drive units 100b_1 to 100d_1 in the first plurality of drive units 100_1 are forward-connected, and all the drive units 100a_2 to 100d_2 in the second plurality of drive units 100_2 are reverse-connected has been described as an example, but the present invention is not limited thereto. For example, in the first drive unit group 11, the first second drive unit 100b_1 and the first fourth drive unit 100d_1 may be forward-connected, and the first third drive unit 100c_1 may be reverse-connected. In the second drive unit group 12, the second first drive unit 100a_2 and the second third drive unit 100c_2 may be forward-connected, and the second second drive unit 100b_2 and the second fourth drive unit 100d_2 may be reverse-connected. In this way, the forward connection and the reverse connection may be mixed in the drive unit group.

In the drive apparatus 10 according to the third embodiment, for example, when wiring is made in this way, in at least one drive unit in the first plurality of drive units 100_1, the first terminal 110 may be forward-connected to the clock signal line SCL, and the second terminal 120 may be forward-connected to the data signal line SDA, and in at least one drive unit in the second plurality of drive units 100_2, the second terminal 120 may be reverse-connected to the clock signal line SCL, and the first terminal 110 may be reverse-connected to the data signal line SDA.

Although the wiring example of the drive apparatus 10 according to the present embodiment has been described using the first to third embodiments, even when wiring is performed in this way, at least one reverse-connected drive unit can communicate as a slave different from at least one forward-connected drive unit as viewed from the master. This will be described in detail.

Figure 7:
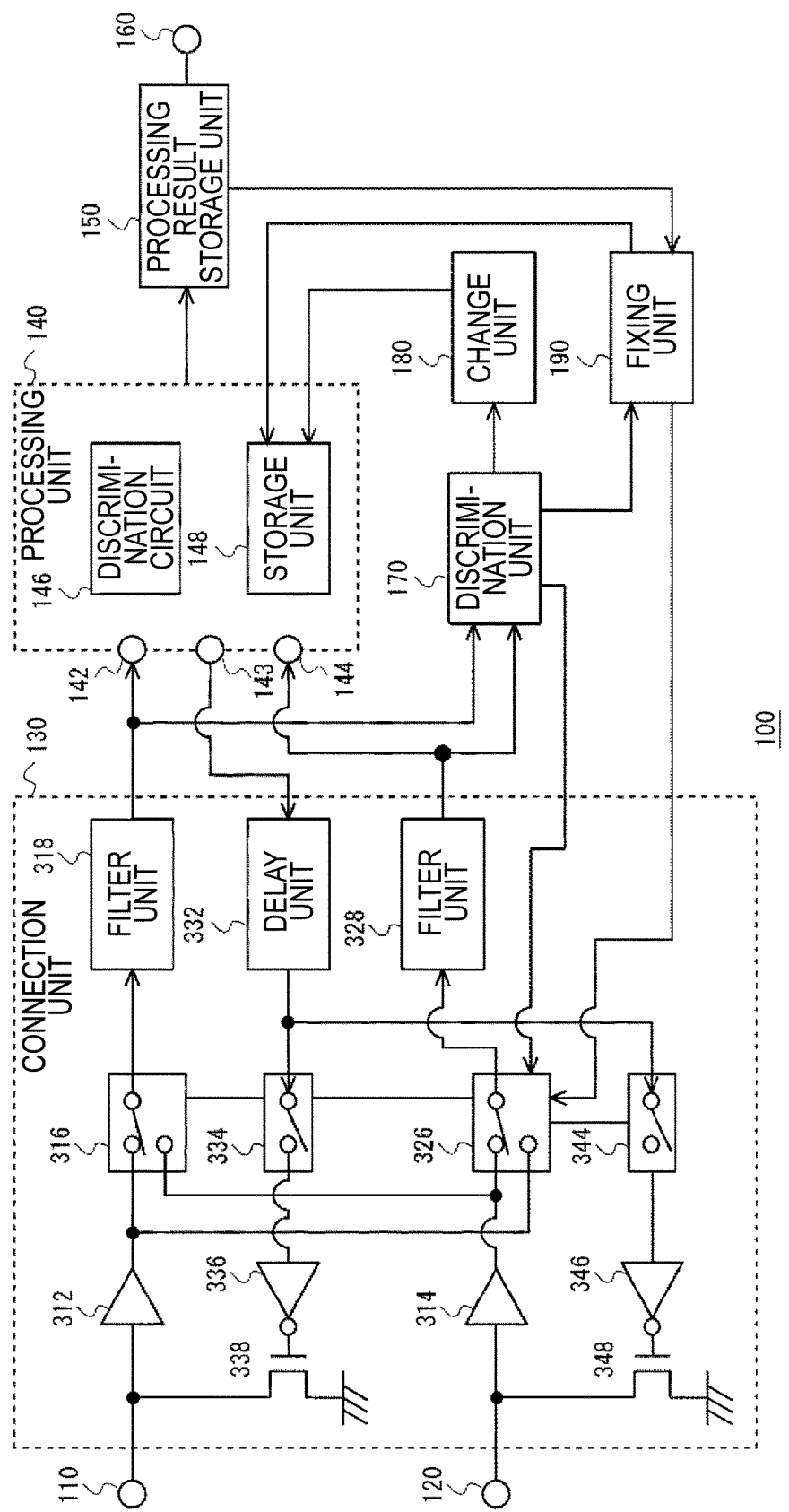
FIG. 7 illustrates an example of a block diagram for achieving a switching function in a drive unit 100.

FIG. 7 illustrates an example of a block diagram for achieving a switching function in the drive unit 100. The drive unit 100 discriminates between the connection destination of the first terminal 110 and the connection destination of the second terminal 120 based on an input signal, and changes its own slave address in accordance with the connection destination. The drive unit 100 includes a connection unit 130, a processing unit 140, a processing result storage unit 150, an output terminal 160, a discrimination unit 170, a change unit 180, and a fixing unit 190.

The connection unit 130 switches between a first state and a second state based on a signal input from the outside. For example, a connection state inside the drive unit 100 corresponding to a state where the clock signal line SCL is connected to the first terminal 110, and the data signal line SDA is connected to the second terminal 120 is set to the first state. The connection unit 130 switches the connection inside the drive unit 100 from the first state to the second state in accordance with a signal notifying that the clock signal line SCL is connected to the second terminal 120 in the first state. Note that the second state is set as a connection state inside the drive unit 100 corresponding to a state where the data signal line SDA is connected to the first terminal 110, and the clock signal line SCL is connected to the second terminal 120.

As an example, in the first state, the connection unit 130 outputs a clock signal from one output and outputs a data signal from another output different from the one output. In addition, in the second state, the connection unit 130 outputs a data signal from the one output and outputs a clock signal from the another output.

The connection unit 130 may receive a data signal from the inside of the drive unit 100, and perform switching to output the input signal from any one of the first terminal 110 and the second terminal 120 based on a signal input from the outside. As an example, in the first state, the connection unit 130 may perform switching to output the data signal from the inside of the drive unit 100 from the second terminal 120, and in the second state, the connection unit may perform switching to output the data signal from the first terminal 110. When a command input from any one of the first terminal 110 and the second terminal 120 includes a read instruction, the connection unit 130 may perform switching to output the data signal from the inside.

The connection unit 130 includes a first amplifier 312, a second amplifier 314, a first switch 316, a filter unit 318, a second switch 326, a filter unit 328, a delay unit 332, a third switch 334, a first inverting amplifier 336, a first switch element 338, a fourth switch 344, a second inverting amplifier 346, and a second switch element 348. Note that the first switch 316, the second switch 326, the third switch 334, and the fourth switch 344 may be switches that perform switching operations in conjunction with each other in accordance with a signal input from the outside.

The first amplifier 312 amplifies a signal input from the first terminal 110. The first amplifier 312 may function as a buffer that amplifies the amplitude voltage of the input signal by approximately 1 time. The first amplifier 312 supplies the amplified signal to the first switch 316 and the second switch 326.

The second amplifier 314 amplifies a signal input from the second terminal 120. The second amplifier 314 may function as a buffer that amplifies the amplitude voltage of the input signal by approximately 1 time. The second amplifier 314 supplies the amplified signal to the first switch 316 and the second switch 326.

The first switch 316 switches and outputs one of the signals input from the first terminal 110 and the second terminal 120. For example, in the first state, the first switch 316 outputs a clock signal input from the first terminal 110. In addition, in the second state, the first switch 316 outputs a clock signal input from the second terminal 120.

The first switch 316 may switch and output the input signal based on a signal input from the outside. As an example, the first switch 316 is switched to output a clock signal among the signals input from the first terminal 110 and the second terminal 120. The first switch 316 supplies the output signal to the filter unit 318.

The filter unit 318 reduces noise of the input signal. The filter unit 318 may be any one of a low-pass filter, a high-pass filter, and a band-pass filter, or may be a combination thereof. The filter unit 318 may output the signal with reduced noise to the processing unit 140. That is, as an example, the connection unit 130 is switched to supply a clock signal from one output regardless of the state of connection between the first terminal 110 and the second terminal 120 and the clock signal line.

The second switch 326 switches and outputs the other of the signals input from the first terminal 110 and the second terminal 120. The second switch 326 is switched in conjunction with the first switch 316 and outputs the other signal different from the one signal output by the first switch 316. For example, in the first state, the second switch 326 outputs a data signal input from the second terminal 120. In addition, in the second state, the second switch 326 outputs a data signal input from the first terminal 110.

The second switch 326 may switch and output the input signal based on a signal input from the outside. As an example, the second switch 326 is switched to output a data signal among the signals input from the first terminal 110 and the second terminal 120. The second switch 326 supplies the output signal to the filter unit 328.

The filter unit 328 reduces noise of the input signal. The filter unit 328 may be any one of a low-pass filter, a high-pass filter, and a band-pass filter, or may be a combination thereof. The filter unit 328 may output the signal with reduced noise to the processing unit 140. That is, as an example, the connection unit 130 is switched to supply a data signal from the other output regardless of the state of connection between the first terminal 110 and the second terminal 120 and the data signal line.

The delay unit 332 receives a data signal from the inside of the drive unit 100. In the delay unit 332, the data signal may be supplied from the processing unit 140. The delay unit 332 delays the input signal by a predetermined or set time and outputs the delayed signal. For example, in order to supply a data signal in accordance with a read instruction from the master connected to the drive unit 100, the delay unit 332 adjusts the timing of data supply to the master by adding a delay to the data signal to be supplied. The delay unit 332 supplies the delayed data signal to the third switch 334 and the fourth switch 344. The delay unit 332 may include a delay circuit such as a flip-flop and a delay line.

The third switch 334 switches whether to output an input signal based on a signal input from the outside. The third switch 334 may be switched in conjunction with the first switch 316 and/or the second switch 326. For example, when the first switch 316 connects a signal from the first terminal 110 to one output, the third switch 334 electrically disconnects the input and the output to turn off. In addition, for example, on condition that the second switch 326 connects the signal from the first terminal 110 to another output, in accordance with a signal instructing the output of the input signal, the third switch 334 electrically connects the input and the output to turn on. In this case, the third switch 334 supplies the input signal to the first inverting amplifier 336.

The first inverting amplifier 336 inverts and amplifies the input signal. The first inverting amplifier 336 may function as a buffer that amplifies the amplitude voltage of the input signal by approximately −1 times. The first inverting amplifier 336 supplies the amplified signal to the first switch element 338.

The first switch element 338 electrically connects or disconnects the first terminal 110 and a reference potential in accordance with the input signal. The first switch element 338 may include a transistor, an FET, an operational amplifier, and/or the like, and may connect the first terminal 110 and the reference potential when the input signal is high and disconnect the first terminal 110 and the reference potential when the input signal is low. Here, the reference potential may be a ground voltage, and is 0 V as an example.

As a result, for example, when a high voltage is applied to the first terminal 110 via a pull-up resistor, the first switch element 338 causes a current to flow from the pull-up resistor to the reference potential to drop the voltage when the input signal becomes high, and sets the first terminal 110 to a low state. In this case, when the input signal becomes low, the first switch element 338 cuts off the current from the pull-up resistor to the reference potential and sets the first terminal 110 to a high state. That is, the first switch element 338 outputs, from the first terminal 110, a logic signal substantially identical to the logic of the data signal input to the first inverting amplifier 336.

Similarly to the third switch 334, the fourth switch 344 switches whether to output an input signal based on a signal input from the outside. The fourth switch 344 may be switched in conjunction with the first switch 316 and/or the second switch 326. For example, when the second switch 326 connects a signal from the second terminal 120 to another output, the fourth switch 344 electrically disconnects the input and the output to turn off. In addition, for example, on condition that the second switch 326 connects the signal from the second terminal 120 to one output, in accordance with to a signal instructing the output of the input signal, the fourth switch 344 electrically connects the input and the output to turn on. In this case, the fourth switch 344 supplies the input signal to the second inverting amplifier 346.

The second inverting amplifier 346 inverts and amplifies the input signal. The second inverting amplifier 346 may function as a buffer that amplifies the amplitude voltage of the input signal by approximately −1 times. The second inverting amplifier 346 supplies the amplified signal to the second switch element 348.

The second switch element 348 electrically connects or disconnects the second terminal 120 and the reference potential in accordance with the input signal. The second switch element 348 may include a transistor, an FET, an operational amplifier, and/or the like, and may connect the second terminal 120 and the reference potential when the input signal is high and disconnect the second terminal 120 and the reference potential when the input signal is low. As a result, similarly to the first switch element 338, the second switch element 348 outputs, from the second terminal 120, a logic signal substantially identical to the logic of the data signal input to the second inverting amplifier 346. Note that in the present drawing, a case where an open drain output is adopted as a signal output form in both the first terminal 110 and the second terminal 120 is illustrated as an example, but the present invention is not limited thereto. In at least either of the first terminal 110 or the second terminal 120, a push-pull output may be adopted as the signal output form.

The processing unit 140 executes processing corresponding to data supplied from an interface. For example, the processing unit 140 may write data in accordance with a write instruction, and may read data in accordance with a read instruction and supply the data to the interface. In addition, the processing unit 140 may calculate data in accordance with a calculation instruction, and may store a calculation result.

The processing unit 140 transmits and receives a data signal to and from the interface by a standardized communication method. The processing unit 140 may transmit and receive data by serial data communication. In the present embodiment, an example will be described in which the processing unit 140 transmits and receives data using an I2C communication method. In addition, the processing unit 140 may convert serial data into parallel data. The processing unit 140 includes a clock reception internal terminal 142, a data transmission internal terminal 143, a data reception internal terminal 144, a discrimination circuit 146, and a storage unit 148.

The clock reception internal terminal 142 receives the clock signal supplied from the clock signal line SCL inside the drive unit 100. The clock reception internal terminal 142 receives, for example, the clock signal supplied from one output of the connection unit 130.

The data transmission internal terminal 143 transmits a data signal from the inside of the drive unit 100 in accordance with a read instruction or the like. For example, the data transmission internal terminal 143 supplies the data signal from the inside of the drive unit 100 to the delay unit 332.

The data reception internal terminal 144 receives the data signal supplied from the data signal line SDA inside the drive unit 100. For example, the data reception internal terminal 144 receives the data signal supplied from another output of the connection unit 130.

That is, as an example, in the first state, the connection unit 130 connects the first terminal 110 and the clock reception internal terminal 142, and connects the second terminal 120 and the data reception internal terminal 144. Then, in accordance with an instruction from the outside, the connection unit 130 switches to the second state where the first terminal 110 is connected to the data reception internal terminal 144 and the second terminal 120 is connected to the clock reception internal terminal 142.

The discrimination circuit 146 starts receiving the data signal based on the phases of the clock signal and the data signal received by the clock reception internal terminal 142 and the data reception internal terminal 144. As an example, on condition that the clock signal input from the clock reception internal terminal 142 is high, when the data signal input from the data reception internal terminal 144 changes from high to low, the discrimination circuit 146 starts receiving the data signal.

The storage unit 148 stores the address of the device. The storage unit 148 may store the address of the device to be changeable. Alternatively, the storage unit 148 may store a plurality of addresses. Note that the address may be an address corresponding to the connection state of the first terminal 110 and the second terminal 120.

For example, the storage unit 148 stores a first address corresponding to the first state where the first terminal 110 is connected to the clock signal line SCL, and the second terminal 120 is connected to the data signal line SDA. In addition, the storage unit 148 may be able to change the first address to a second address corresponding to the second state where the first terminal 110 is connected to the data signal line SDA, and the first terminal 110 is connected to the clock signal line SCL. Alternatively, the storage unit 148 may store each of the first address and the second address. In this case, the storage unit 148 stores address information together with a value indicating which of the first address and the second address is valid.

After the discrimination circuit 146 starts receiving the data signal, the processing unit 140 according to the present embodiment described above executes processing corresponding to the data signal when the address included in the data signal designates the (valid) address stored in the storage unit 148. For example, when the first address is stored (valid) in the storage unit 148, the processing unit 140 executes processing corresponding to the data signal on condition that the first address of the data signal is designated. In addition, when the information of the first address of the storage unit 148 is changed to the second address (the second address is changed to be valid), the processing unit 140 executes processing corresponding to the data signal on condition that the second address of the data signal is designated.

The processing result storage unit 150 stores the result processed by the processing unit 140. In the processing result storage unit 150, data may be written by the write processing of the processing unit 140. In addition, the processing result storage unit 150 may read the written data by the processing unit 140. In addition, the processing result storage unit 150 may store data in advance, and the processing unit 140 may read the data. In addition, the processing result storage unit 150 may store the calculation result or the like of the processing unit 140.

The processing result storage unit 150 may store the connection state inside the drive unit 100. The processing result storage unit 150 may store a current connection state or the like among the first state and the second state which are switched by the connection unit 130. In addition, the processing result storage unit 150 may store a setting value or the like of the drive unit 100. The processing result storage unit 150 may supply the stored setting values, data, and the like to a request source in accordance with a request from each unit in the drive unit 100.

The processing result storage unit 150 may be connected to the output terminal 160 and communicate with the outside via the output terminal 160. That is, the processing result storage unit 150 may supply the stored processing result of the processing unit 140 to the outside. The processing unit 140 may communicate with the interface at a speed conforming to the standard by a standardized serial data communication method and perform parallel conversion on the received data signal. Then, the processing result storage unit 150 may store the converted data and supply the stored data from the output terminal 160 to the outside by a method different from the communication method between the processing unit 140 and the interface. In this case, the communication speed from the output terminal 160 to the outside may be lower than the communication speed between the processing unit 140 and the interface.

The discrimination unit 170 discriminates, based on the signals input from the first terminal 110 and the second terminal 120, which of the first terminal 110 and the second terminal 120 is connected with the clock signal line SCL. The discrimination unit 170 discriminates, based on a phase difference between the signals supplied from the clock signal line SCL0 and the data signal line SDA, which of the first terminal 110 and the second terminal 120 is connected with the clock signal line SCL.

The discrimination unit 170 may receive each of the clock signal output from the filter unit 318 and the data signal output from the filter unit 328 and discriminate, based on the received signals, whether the clock signal line SCL is connected to the second terminal 120. As an example, on condition that the data signal input from the second terminal 120 is high, when the data signal input from the first terminal 120 changes from high to low, the discrimination unit 170 discriminates that the clock signal line SCL is connected to the second terminal 110. The discrimination unit 170 may supply the discrimination result to the connection unit 130, the change unit 180, and the fixing unit 190.

The change unit 180 changes the address of the drive unit 100 based on the discrimination unit 170 discriminating the connection between the second terminal 120 and the clock signal line SCL. In this case, the change unit 180 may change the first address stored in the storage unit 148 to the second address. Alternatively, when the first address and the second address are stored in the storage unit 148 and the first address is valid, the change unit 180 may invalidate the first address and validate the second address.

The fixing unit 190 receives an instruction from the outside and fixes the connection of the first terminal 110 and the second terminal 120 with the clock reception internal terminal 142 and the data reception internal terminal 144. That is, the fixing unit 190 stops or invalidates the switching operation of the connection unit 130, and fixes the connection inside the connection unit 130.

The fixing unit 190 receives an instruction from the outside and fixes the address of the drive unit 100 to an address corresponding to the connection of the first terminal 110 and the second terminal 120 with the clock reception internal terminal 142 and the data reception internal terminal 144. That is, the fixing unit 190 stops or invalidates the address changing operation of the change unit 180, and fixes the address of the drive unit 100. In addition, the fixing unit 190 may instruct switching of the third switch 334 and the fourth switch 344.

For example, when there is the drive unit 100 that cannot be distinguished only by the forward connection/reverse connection of the I2C unlike the first second drive unit 100b_1 and the first fourth drive unit 100d_1, the second second drive unit 100b_2 and the second fourth drive unit 100d_2, or the like in the second embodiment illustrated in FIG. 3, the drive unit 100 may further have, as a specific means for changing a slave address, a function described in Japanese patent application publication No. 2019-046098, that is, a function of receiving an external output and changing the slave address.

For example, in the drive apparatus 10, there can be the drive unit 100 in which the magnet 3 is in the vicinity and the drive unit 100 in which the magnet is not in the vicinity. As an example, in the first drive unit group 11 of the second embodiment, when the first magnet 31 is at the position illustrated in FIG. 3, the first first drive unit 100a_1 and the first fourth drive unit 100d_1 are separated from the first magnet 31, and thus the magnetic field generated by the first magnet 3_1 hardly enters the first first drive unit 100a_1 and the first fourth drive unit 100d_1. On the other hand, the first magnet 31 is in the vicinity of the first second drive unit 100b_1 and the first third drive unit 100c_1, and thus the magnetic field generated by the first magnet 3_1 sufficiently enters the first second drive unit 100b_1 and the first third drive unit 100c_1. Therefore, the drive unit 100 may determine such a condition (such as the magnitude of the magnetic field) and change the slave address.

Alternatively or additionally, the drive unit 100 may further have, as a specific means for changing the slave address, a function described in Japanese patent No. 6927811, that is, a function of using a driver output terminal like a chip selector.

As an example, in the second drive unit group 12 of the second embodiment, the second first drive unit 100a_2 as a master may cause the slave-connected second second drive unit 100b_2, second third drive unit 100c_2, and second fourth drive unit 100d_2 to transition to a selection mode. Then, a selection circuit may give a "High" signal to the slave desired to be designated and give a "Low" signal to the other slaves. As a result, the designated slave may sense selection. Then, the second first drive unit 100a_2 as a master may supply slave address change information. As a result, only the slave that has sensed the selection may change the slave address. More specifically, a control target line may be led out from each of the slave-connected second second drive unit 100b_2, second third drive unit 100c_2, and second fourth drive unit 100d_2, and each control target line may be connected to the selection circuit. At this time, the general purpose input/output (GPIO) of the host 20' may be used as the selection circuit. Then, by setting the GPIO pin to "High" or "Low", only the designated drive unit 100 may be caused to sense the selection and change the slave address.

In this way, each of the first plurality of drive units 100_1 and the second plurality of drive units 1002 is configured to be able to discriminate between the clock signal and the data signal and switch between an internal clock signal line and an internal data signal line. Then, at least one reverse-connected drive unit discriminates between the clock signal and the data signal, switches between the internal clock signal line and the internal data signal line, and changes its own slave address in accordance with switching between the internal clock signal line and the internal data signal line. As a result, the at least one reverse-connected drive unit can communicate as a slave different from at least one forward-connected drive unit as viewed from the master.

Figure 8:
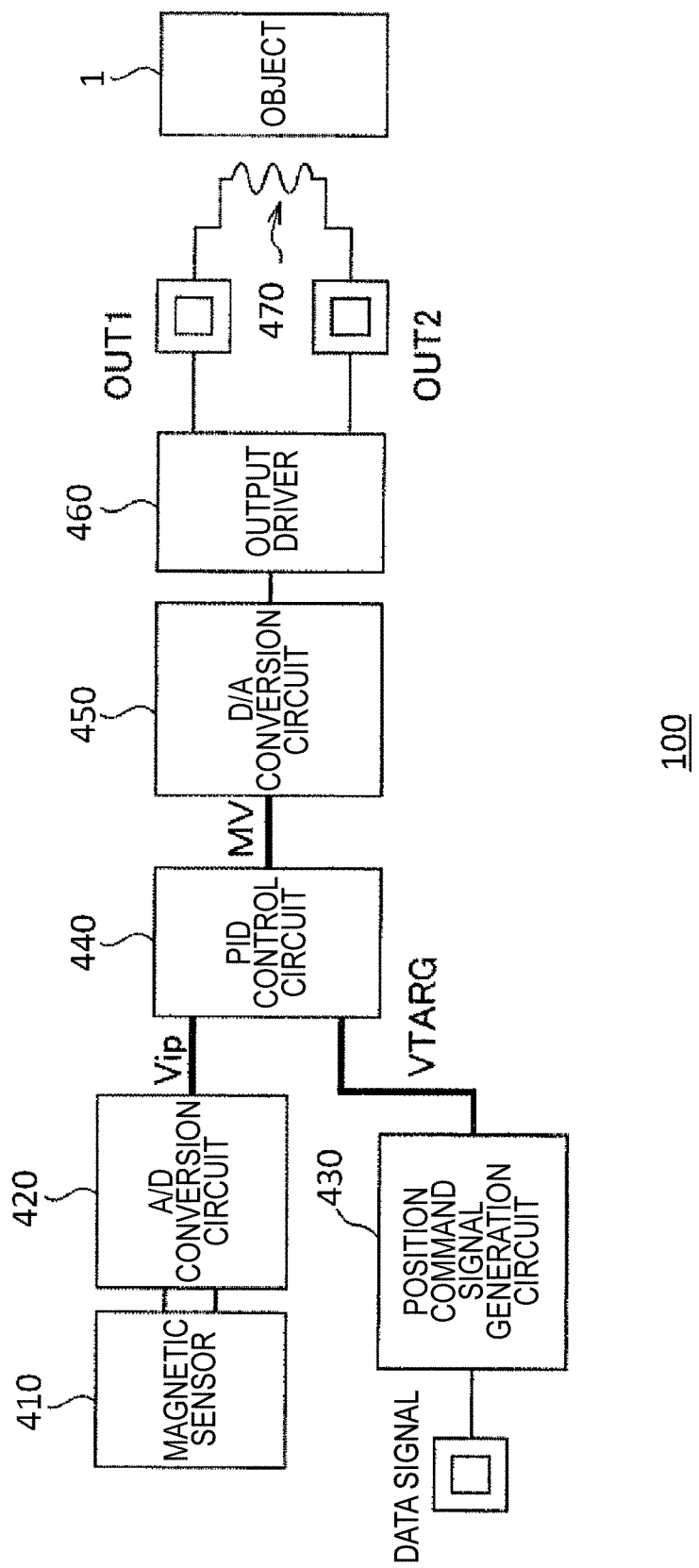
FIG. 8 illustrates an example of a block diagram for achieving a driving function in the drive unit 100 together with the object 1.

FIG. 8 illustrates an example of a block diagram for achieving a driving function in the drive unit 100 together with the object 1. The drive unit 100 includes a magnetic sensor 410, an A/D conversion circuit 420, a position command signal generation circuit 430, a PID control circuit 440, a D/A conversion circuit 450, an output driver 460, and a drive coil 470.

The magnetic sensor 410 detects the magnetic field generated by the magnet 3 provided in the object 1, and outputs a detection position signal Vip corresponding to a value of the detected magnetic field. As an example, such a magnetic sensor 410 may be a Hall sensor that detects a change in an external magnetic field from a generated electromotive force by applying the Hall effect. However, the present invention is not limited thereto. The magnetic sensor 410 may be various sensors, which are capable of detecting a magnetic field, such as a spin valve type magnetoresistive element (a GMR element, a TMR element, or the like) in which a resistance changes in accordance with a change in the external magnetic field, and may be a combination of these various sensors. In addition, the magnetic sensor 410 may include a sensor element group including a plurality of magnetic sensor elements. That is, each of the first plurality of drive units 1001 may include at least one magnetic sensor element that detects the magnetic field generated by the first magnet 3_1. In addition, each of the second plurality of drive units 100_2 may include at least one magnetic sensor element that detects the magnetic field generated by the second magnet 3_2.

The A/D conversion circuit 420 amplifies and A/D-converts the detection position signal from the magnetic sensor 410, and outputs the A/D-converted detection position signal Vip.

The position command signal generation circuit 430 outputs, in accordance with the data signal, a target position command signal VTARG indicating a target position to which the object 1 is to be moved.

The PID control circuit 440 outputs a control signal MV for moving the object 1 to the target position from the current position of the object 1 indicated by the detection position signal Vip and the target position of the object 1 indicated by the target position command signal VTARG.

The D/A conversion circuit 450 D/A-converts the control signal MV from the PID control circuit 440, and outputs the D/A-converted control signal MV.

The output driver 460 supplies a drive current to the drive coil 470 in accordance with the control signal MV from the D/A conversion circuit 450.

The drive coil 470 drives the magnet 3 provided on the object 1. The drive coil 470 is wound along the optical axis direction of the lens 2 provided in the object 1, and has a first output terminal OUT1 at one end in the optical axis direction and a second output terminal OUT2 at the other end. Then, when a drive current is supplied from the output driver 460, the drive coil 470 generates a magnetic field corresponding to the drive current. At this time, the generated magnetic fields are in the opposite direction between a case where the drive current flows from the first output terminal OUT1 to the second output terminal OUT2 and a case where the drive current flows from the second output terminal OUT2 to the first output terminal OUT1. As a result, the drive coil 470 can drive the object 1 provided with the magnet 3 back and forth along the optical axis direction.

Here, the PID control is a type of feedback control, and is a method of controlling an input value by using three elements of a deviation between an output value and a target value, and the integration and differentiation thereof. There is proportional control (P control) as basic feedback control. This is to control the input value by using a linear function of the deviation between the output value and the target value. In the PID control, an operation of changing the input value in proportion to this deviation is referred to as a proportional operation or a P operation (P is an abbreviation of proportional). That is, when a state with the deviation continues for a long time, the P operation serves to increase the change of the input value accordingly to approach the target value. An operation of changing the input value in proportion to the integral of the deviation is referred to as an integral operation or an I operation (I is an abbreviation of integral). A control method in which the proportional operation and the integral operation as described above are combined is referred to as PI control. An operation of changing the input value in proportion to the differentiation of the deviation is referred to as a differential operation or a D operation (D is an abbreviation of derivative or differential). A control in which the proportional operation, the integral operation, and the differential operation as described above are combined is referred to as PID control.

In the present embodiment, each of the drive units 100 may have such a driving function. That is, each of the first plurality of drive units 100_1 may drive the first object 1 by feedback control based on a target position command signal VTARG1 of the first object 1 and a detection position signal Vip1 of the first object 1. In addition, each of the second plurality of drive units 1002 may drive the second object 2 by feedback control based on a target position command signal VTARG2 of the second object 2 and a detection position signal Vip2 of the second object 2.

In each drive unit group, the plurality of drive units 100 each having such a driving function is disposed along the optical axis direction of the lens 2. That is, in the first drive unit group 11, the first plurality of drive units 100_1 each having such a driving function is disposed along the optical axis direction of the first lens 2_1. In such a first plurality of drive units 100_1, one drive unit that drives the first object 11 is assigned in advance to be in charge of each of a plurality of sections obtained by dividing the first movable range. Then, each drive unit 100 drives the first object 1_1 in the section of which the drive unit 100 is in charge, whereby the first plurality of drive units 1001 cooperatively drives the first object 11 over the first movable range.

Similarly, in the second drive unit group 12, the second plurality of drive units 100_2 each having such a driving function is disposed along the optical axis direction (which may be the same direction as the optical axis direction of the first lens 2_1) of the second lens 2_2. In such a second plurality of drive units 100_2, one drive unit that drives the second object 1_2 is assigned in advance to be in charge of each of a plurality of sections obtained by dividing the second movable range. Then, each drive unit 100 drives the second object 1_2 in the section of which the drive unit 100 is in charge, whereby the second plurality of drive units 100_2 cooperatively drives the second object 1_2 over the second movable range.

This will be described in detail. Note that here, the first first drive unit 100*a*_1 and the second first drive unit 100*a*_2 are collectively referred to as a "first drive unit 100*a*". In addition, the first second drive unit 100*b*_1 and the second second drive unit 100*b*_2 are collectively referred to as a "second drive unit 100*b*". In addition, the first third drive unit 100*c*_1 and the second third drive unit 100*c*_2 are collectively referred to as a "third drive unit 100*c*". In addition, the first fourth drive unit 100*d*_1 and the first fourth drive unit 100*d*_2 are collectively referred to as a "fourth drive unit 100*d*".

FIG. 9 illustrates an example of assignment of the drive unit 100 in charge of each of a plurality of sections. In the present drawing, a case where when the position of the object 1 at one end of the movable range is 0 mm, and the position of the object 1 at the other end is 10 mm, the movable range is divided by 1 mm into ten sections is illustrated as an example. As an example, the first drive unit 100*a* is assigned to be in charge of a section 0 and applies, in a forward direction, a drive current to a drive coil 470*a* included in the first drive unit 100*a* to drive the object 1 from the position of 0 mm to the position of 1 mm. Note that the forward direction described herein is an application direction from a first output terminal OUT1 to a second output terminal OUT2. Similarly, the second drive unit 100*b* is assigned to be in charge of the section 1 and applies, in a reverse direction, a drive current to a drive coil 470*b* included in the second drive unit 100*b* to drive the object 1 from the position of 1 mm to the position of 2 mm. Note that the reverse direction described here is an application direction from the second output terminal OUT2 to the first output terminal OUT1. The same applies to the other sections. In this way, in each drive unit group, one drive unit that drives the object 1 may be assigned in advance to be in charge of each of the plurality of sections obtained by dividing the movable range.

Figure 10:
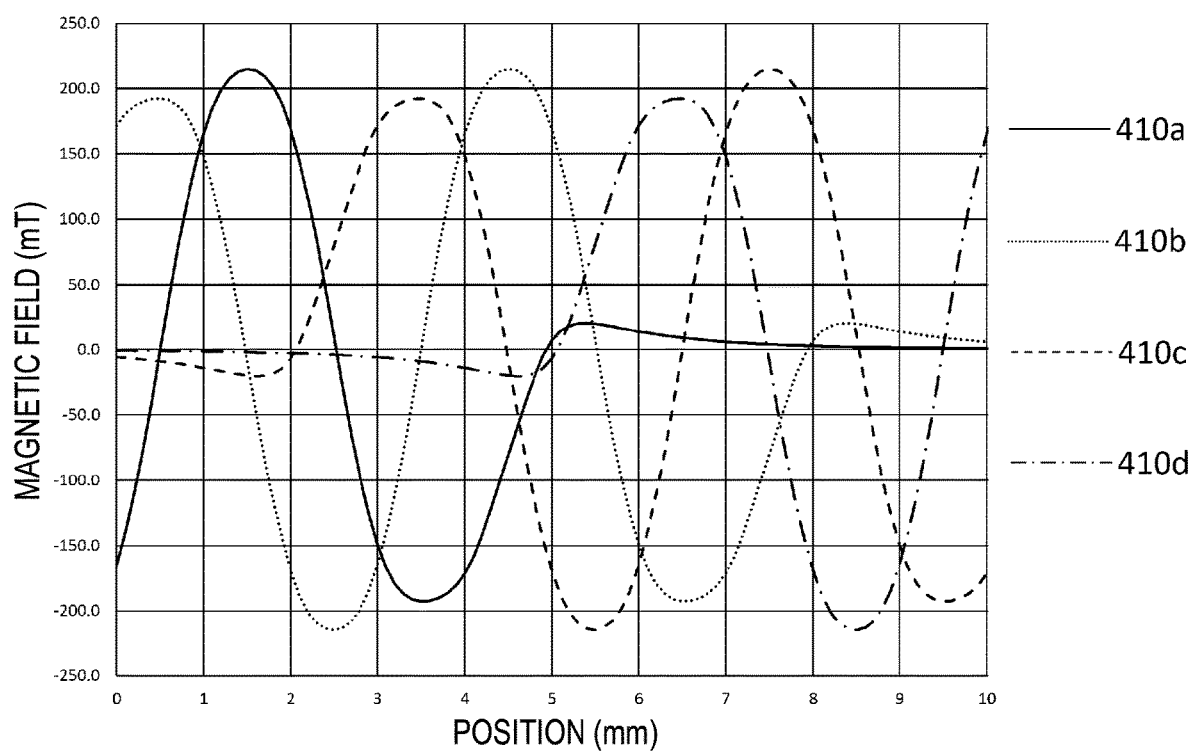
FIG. 10 illustrates an example of a simulation result of a magnetic field detected when the object 1 is driven within a movable range.

FIG. 10 illustrates an example of a simulation result of the magnetic field detected when the object 1 is driven within the movable range. In the present drawing, a horizontal axis represents the position of the object 1 in units of [mm]. In the present drawing, a vertical axis represents the simulation result of the detected magnetic field in units of (mT). In the present drawing, a solid line indicates the simulation result of the magnetic field detected by a magnetic sensor 410*a* included in the first drive unit 100*a*. In the present drawing, a dotted line indicates the simulation result of the magnetic field detected by a magnetic sensor 410*b* included in the second drive unit 100*b*. In the present drawing, a broken line indicates the simulation result of the magnetic field detected by a magnetic sensor 410*c* included in the third drive unit 100*c*. In the present drawing, a long chain line indicates the simulation result of the magnetic field detected by a magnetic sensor 410*d* included in the fourth drive unit 100*d*.

Each of the drive units 100 detects, by the magnetic sensor 410, such a magnetic field generated by the magnet 3 provided on the object 1. Then, each of the drive units 100 drives the object 1 by feedback control based on the target position command signal VTARG of the object 1 and the detection position signal Vip of the object 1.

Figure 11:
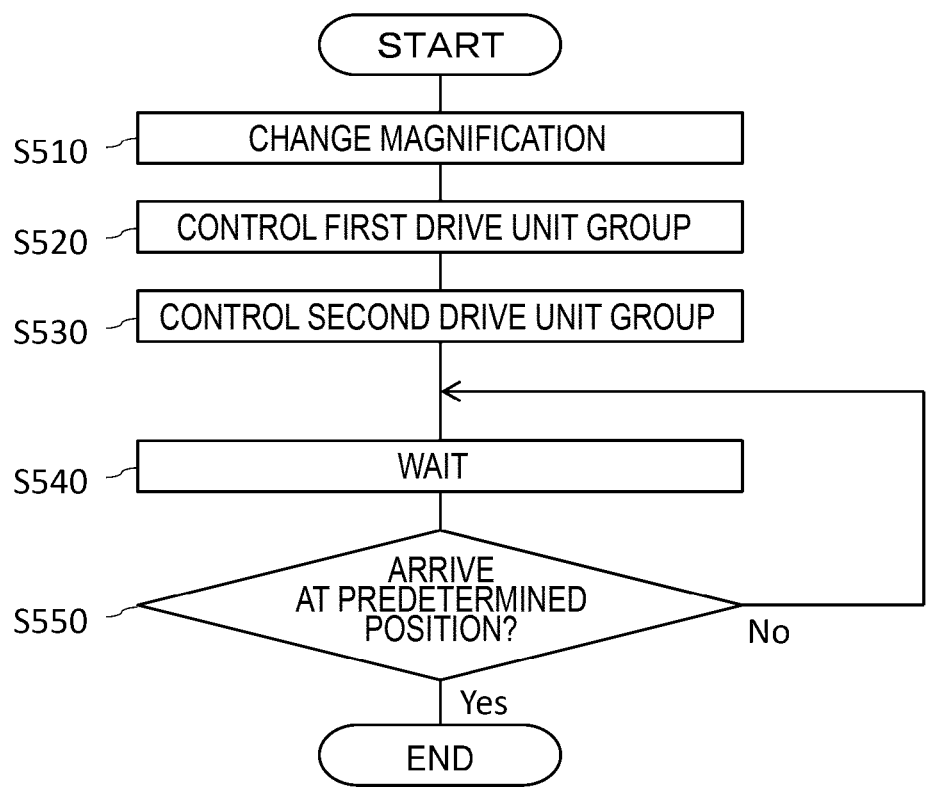
FIG. 11 illustrates an example of a flow in which a controller controls the drive apparatus 10 according to the present embodiment.

FIG. 11 illustrates an example of a flow in which the controller controls the drive apparatus 10 according to the present embodiment.

In step S510, the magnification is changed. For example, the ISP detects that the magnification is changed by a user.

In step S520, the controller controls the first drive unit group 11. As a result, the first plurality of drive units 100_1 included in the first drive unit group 11 cooperatively drives the first object 1_1.

In step S530, the controller controls the second drive unit group 12. As a result, the first plurality of drive units 100_2 included in the second drive unit group 12 cooperatively drives the second object 1_2.

The controller may execute the process of step S530 immediately after executing the process of step S520. Although it requires several milliseconds to actually drive the object 1, the delay of the I2C command is on the order of sec. Therefore, the delay from step S520 to step S530 is in a sufficiently negligible range. As a result, the controller can drive the first object 1_1 and the second object 12 almost simultaneously as if the first object 1_1 and the second object 1_2 are synchronized with each other. Therefore, the controller can smoothly drive the lens 2 with reducing the defocus caused by the fluctuation of the magnification and not giving the user a sense of discomfort (to suppress a phenomenon such as motion sickness due to a sudden change in a screen or a sudden deviation from what the user desires to photograph).

In step S540, the controller waits for a certain period of time. For example, the controller sets a timer to a predetermined period (several milliseconds) and starts the timer, and waits until the timer expires.

In step S550, the controller determines whether the object 1 has arrived at a predetermined position. When it is determined that the object has not arrived (No), the controller returns the processing to step S540 and continues the flow. On the other hand, when it is determined that the object has arrived (Yes), the controller ends this flow.

For example, by such a flow, the controller controls at least either of the first drive unit group 11 or the second drive unit group 12 to drive at least either of the first object 1_1 or the second object 1_2 to a target position in the optical axis direction.

At this time, the controller may control the first drive unit group 11 and the second drive unit group 12 to drive the first object 1_1 and the second object 12 from the current positions to the target positions at once, or may perform the control to drive the first object 1_1 and the second object 1_2 in a stepwise manner. This will be described in detail.

Figure 12:
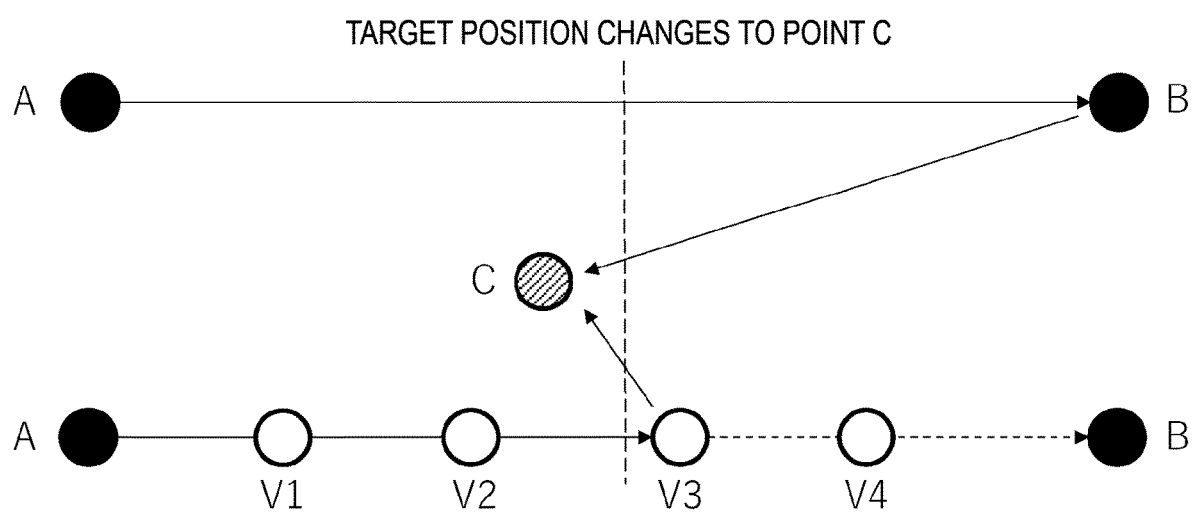
FIG. 12 illustrates an example of a case where the object 1 is driven at once and a case where the object 1 is driven in a stepwise manner.

FIG. 12 illustrates an example of a case where the object 1 is driven at once and a case where the object 1 is driven in a stepwise manner. The present drawing illustrates a case where the object 1 is driven at once from a point A that is the current position to a point B that is the target position. That is, in the flow of FIG. 11, a case is illustrated in which the predetermined position is set to the point B that is the target position, and the object 1 is driven at once from the point A that is the current position to the point B that is the target position. In such a case, when the target position is changed to a point C while the object 1 is driven from the point A to the point B, after the object 1 arrives at the point B, the predetermined position is set to the point C, and the flow of FIG. 11 is executed again. Therefore, a time until the object 1 arrives at the point C is lengthened.

In this regard, the controller may drive the object 1 in a stepwise manner. The lower part of the present drawing illustrates a case where when the object 1 is driven from the point A that is the current position to the point B that is the target position, the object 1 is driven in a stepwise manner with a first via point V1, a second via point V2, a third via point V3, and a fourth via point V4 set. That is, in the flow of FIG. 11, the controller sets the predetermined position as the first via point V1, and drives the object 1 from the point A that is the current position to the first via point V1. When the object 1 arrives at the first via point V1, the controller sets the predetermined position to the second via point V2 and executes the flow of FIG. 11 again. When the object 1 arrives at the second via point V2, the controller sets the predetermined position to the third via point V3 and executes the flow of FIG. 11 again.

In such a case, when the target position is changed to the point C while the object 1 is driven from the point A to the point B, after the object 1 arrives at the immediately following via point, in the present drawing, the third via point V3, the predetermined position is set to the point C, and the flow of FIG. 11 can be executed again. In this way, when driving at least either of the first object 1_1 or the second object 1_2 to the target position, the controller sets a plurality of via points obtained by dividing a path to the target position, and executes the driving to each via point in the plurality of via points in a stepwise manner. Then, when the target position is changed, the controller drives at least either of the first object 1_1 or the second object 1_2 from the via point immediately after the change in the plurality of via points to the changed target position. As a result, the controller can set the changed target position without waiting for the object 1 to arrive at the point B, so that the time until the object 1 arrives at the point C can be shortened.

In this way, by performing control to drive in a stepwise manner, the controller can shorten the arrival time when the target position is changed. However, on the other hand, since the stepwise control repeats the flow of FIG. 11 by the number of via points, when the target position remains at the point B without any change, the time until arrival at the target position increases as the number of via points increases. That is, as the number of via points increases, the arrival time when the target position is changed can be shortened, while the arrival time when the target position is not changed is lengthened. Therefore, the number of via points is necessarily changed in use or operation mode. For example, in the case of a reset operation of the camera position and an abnormality detection, it is desirable to perform a high-speed operation, and the target position is not changed, so that it is proper not to drive in a stepwise manner. Here, the reset operation is, for example, an operation for setting the lens 2 to a predetermined reference position, for example, the position of 0 mm after the power is turned on. The abnormality detection is an operation performed when magnetic field information or a drive signal different from the assumption of the controller is detected from the drive unit 100 due to an external impact or the like. On the other hand, in an image capturing mode in which the target position can be changed (for example, by the user), it is desirable to follow the target position despite a slight delay, and thus, the stepwise control is preferable. Therefore, in this way, the controller may determine which mode to drive based on the current operation state. That is, the controller may be capable of switching whether to execute the above-described driving in a stepwise manner in accordance with the operation state of a system including the object 1.

In general, the lens control of a camera requires high accuracy, and minute position detection of several μm or less is required. Even with a driving distance of several mm, the requirement for the accuracy does not change, and a lens with a variable magnification tends to be heavy. However, from the viewpoint of linearity of the magnetic field or the like, the drivable range in one drive unit 100 is limited to about 1 to 2 mm, and when the drive coil 470 is made excessively large, a driving force may be reduced. In this regard, by dividing the movable range into a plurality of parts by using the plurality of drive units 100 and performing closed-loop control (feedback control), the lens 2 can be driven while maintaining the current accuracy and torque.

At this time, when the plurality of drive units 100 is used, for example, it is conceivable to perform communication by a communication means having a chip selector function such as a 4-wire serial peripheral interface (SPI). However, in the communication means, the number of communication lines increases, which may lead to an increase in size of the drive apparatus 10. In this regard, in order to solve such a problem, in the drive apparatus 10 according to the present embodiment, a drive unit group that drives each of a lens group having a variable magnification function and a lens group having a focus adjustment function is connected in the forward connection and the reverse connection. As a result, according to the drive apparatus 10 of the present embodiment, the same IC can be used as the plurality of drive units 100, and a large number of wires that are typically required can be minimized. Thus, it is possible to contribute to the downsizing of the housing size of the drive apparatus 10 and to the reduction of cost. In addition, when there is a plurality of the same ICs, a mass production test time for changing the slave address of the IC can occur, but according to the drive apparatus 10 according to the present embodiment, the flow can be shortened, and thus the manufacturing cost can be reduced.

Various embodiments of the present invention may also be described with reference to flowcharts and block diagrams, where the blocks may represent (1) a stage of a process in which an operation is performed or (2) a section of an apparatus that is responsible for performing the operation. Specific stages and sections may be implemented by a dedicated circuit, a programmable circuit supplied with a computer-readable instruction stored on a computer-readable medium, and/or a processor supplied with the computer-readable instruction stored on the computer-readable medium. The dedicated circuit may include a digital and/or analog hardware circuit, and may include an integrated circuit (IC) and/or a discrete circuit. The programmable circuit may include a reconfigurable hardware circuit which includes memory elements such as logical AND, logical OR, logic XOR, logic NAND, logic NOR, and other logical operations, flip-flops, registers, field programmable gate arrays (FPGA), programmable logic arrays (PLA), or the like.

The computer-readable medium may include any tangible device capable of storing instructions for execution by an appropriate device, so that the computer-readable medium having the instructions stored thereon includes a product including instructions that can be executed to create means for executing the operations designated in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-Ray (registered trademark) disk, a memory stick, an integrated circuit card, and the like.

The computer-readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

The computer-readable instruction may be provided for a processor of a general-purpose computer, a special purpose computer, or another programmable data processing apparatus, or a programmable circuit locally or via a local area network (LAN) or a wide area network (WAN) such as the Internet, and the computer-readable instruction may be executed to create means for executing the operations designated in the flowcharts or block diagrams. Examples of the processor include a computer processor, a processing unit, a microprocessor, a digital signal processor, a controller, a microcontroller, and the like.

Figure 13:
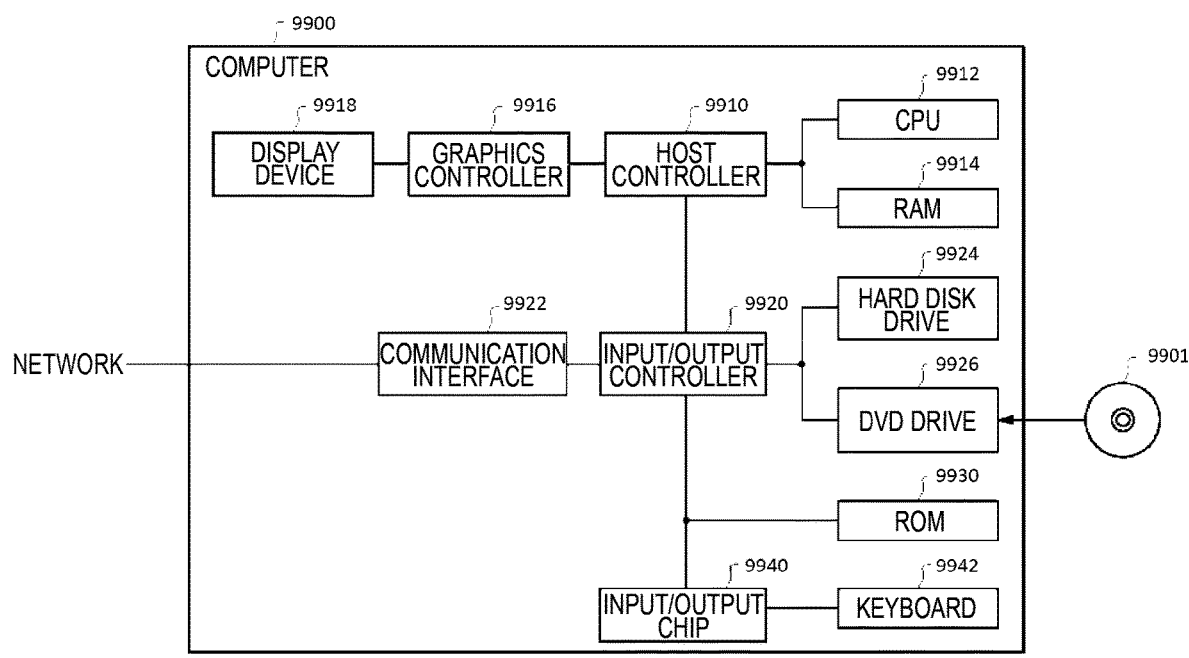
FIG. 13 illustrates an example of a computer 9900 in which a plurality of aspects of the present invention may be embodied in whole or in part.

FIG. 13 illustrates an example of a computer 9900 in which a plurality of aspects of the present invention may be embodied in whole or in part. A program installed in the computer 9900 can cause the computer 9900 to function as an operation associated with the apparatus according to the embodiment of the present invention or as one or more sections of the apparatus, or can cause the operation or the one or more sections to be executed, and/or can cause the computer 9900 to execute a process according to the embodiment of the present invention or a stage of the process. Such a program may be executed by a CPU 9912 to cause the computer 9900 to perform certain operations associated with some or all of the blocks in the flowcharts and block diagrams described in the present specification.

The computer 9900 according to the present embodiment includes the CPU 9912, a RAM 9914, a graphic controller 9916, and a display device 9918, which are interconnected by a host controller 9910. The computer 9900 also includes input/output units such as a communication interface 9922, a hard disk drive 9924, a DVD drive 9926, and an IC card drive, which are connected to the host controller 9910 via an input/output controller 9920. The computer also includes as a ROM 9930 and legacy input/output units such as a keyboard 9942, which are connected to input/output controller 9920 via an input/output chip 9940.

The CPU 9912 operates according to the programs stored in the ROM 9930 and the RAM 9914, thereby controlling each unit. The graphics controller 9916 acquires the image data generated by the CPU 9912 in a frame buffer or the like provided in the RAM 9914 or in itself and causes the image data to be displayed on the display device 9918.

The communication interface 9922 communicates with other electronic devices via a network. The hard disk drive 9924 stores programs and data used by the CPU 9912 in the computer 9900. The DVD drive 9926 reads programs or data from the DVD-ROM 9901 and provides the programs or data to the hard disk drive 9924 via the RAM 9914. The IC card drive reads programs and data from the IC card, and/or writes programs and data to the IC card.

The ROM 9930 stores therein a boot programs or the like executed by the computer 9900 at the time of activation and/or a program depending on the hardware of the computer 9900. The input/output chip 9940 may also connect various input/output units to the input/output controller 9920 via parallel ports, serial ports, keyboard ports, mouse ports, or the like.

The program is provided by a computer-readable medium such as the DVD-ROM 9901 or the IC card. The program is read from a computer-readable medium, installed in the hard disk drive 9924, the RAM 9914, or the ROM 9930 which are also examples of the computer-readable medium, and executed by the CPU 9912. The information processing described in these programs is read by the computer 9900 and provides cooperation between the programs and various types of hardware resources. The apparatus or method may be configured by implementing operations or processing of information according to use of the computer 9900.

For example, when communication is performed between the computer 9900 and an external device, the CPU 9912 may execute a communication program loaded in the RAM 9914 and instruct the communication interface 9922 to perform communication processing on the basis of the processing described in the communication program. Under the control of the CPU 9912, the communication interface 9922 reads transmission data stored in a transmission buffer processing area provided in a recording medium such as the RAM 9914, the hard disk drive 9924, the DVD-ROM 9901, or the IC card, transmits the read transmission data to the network, or writes reception data received from the network in a reception buffer processing area or the like provided on the recording medium.

The CPU 9912 may cause the RAM 9914 to read all or a necessary portion of a file or a database stored in an external recording medium such as the hard disk drive 9924, the DVD drive 9926 (DVD-ROM 9901), or the IC card, and may execute various types of processing on data on the RAM 9914. Next, the CPU 9912 writes back the processed data to the external recording medium.

Various types of information such as various types of programs, data, tables, and databases may be stored in a recording medium and subjected to information processing. The CPU 9912 may execute various types of processing, which is described throughout the present disclosure and includes various types of operations designated by an instruction sequence of a program, information processing, condition determination, conditional branching, unconditional branching, information retrieval/replacement, and the like, on the data read from the RAM 9914 and writes back the results to the RAM 9914. In addition, the CPU 9912 may retrieve information in a file, a database, or the like in the recording medium. For example, when a plurality of entries each having the attribute value of a first attribute associated with the attribute value of a second attribute is stored in the recording medium, the CPU 9912 may retrieve an entry matching a condition in which the attribute value of the first attribute is designated from the plurality of entries, read the attribute value of the second attribute stored in the entry, and thus acquire the attribute value of the second attribute associated with the first attribute satisfying a predetermined condition.

The programs or software modules described above may be stored in a computer-readable medium on the computer 9900 or near the computer 9900. In addition, a recording medium such as a hard disk or a RAM provided in a server system connected to a dedicated communication network or the Internet can be used as the computer-readable medium, thereby providing a program to the computer 9900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 object
1_1 first object
1_2 second object
2 lens
2_1 first lens
2_2 second lens
3 magnet
3_1 first magnet
3_2 second magnet
11 first drive unit group
12 second drive unit group 20 Host
100 drive unit
100a first drive unit
100a_1 first first drive unit
100b_2 second first drive unit
100b second drive unit
100b_1 first second drive unit
100b_2 second second drive unit
100c third drive unit
100c_1 first third drive unit
100c_2 second third drive unit
100 d fourth drive unit
100d_1 first fourth drive unit
100d_2 second fourth drive unit
110 first terminal
120 second terminal
130 connection unit
140 processing unit
142 clock reception internal terminal
143 data transmission internal terminal
144 data reception internal terminal
146 discrimination circuit
148 storage unit
150 processing result storage unit
160 output terminal
170 discrimination unit
180 change unit
190 fixing unit
312 first amplifier
314 second amplifier
316 first switch
318 filter unit
326 second switch
328 filter unit
332 delay unit
334 third switch
336 first inverting amplifier
338 first switch element
344 fourth switch
346 second inverting amplifier
410 magnetic sensor
420 A/D conversion circuit
430 position command signal generation circuit
440 PID control circuit
450 D/A conversion circuit
460 output driver
470 drive coil
9900 computer
9901 DVD-ROM
9910 host controller
9912 CPU
9914 RAM
9916 graphic controller
9918 display device
9920 input/output controller
9922 communication interface
9924 hard disk drive
9926 DVD drive
9930 ROM
9940 input/output chip
9942 keyboard

What is claimed is:

1. A drive apparatus comprising:
a first drive unit group including a first plurality of drive units, each of which is configured to generate a magnetic field to drive a first object provided with a first lens and a first magnet in an optical axis direction; and
a second drive unit group including a second plurality of drive units, each of which is configured to generate a magnetic field to drive a second object provided with a second lens and a second magnet in the optical axis direction, wherein
each of the first plurality of drive units and the second plurality of drive units includes a first terminal and a second terminal that are connected via a clock signal line and a data signal line to a master that controls the drive unit as a slave,
in at least one drive unit in the first plurality of drive units, the first terminal is forward-connected to the clock signal line, and the second terminal is forward-connected to the data signal line,
in at least one drive unit in the second plurality of drive units, the second terminal is reverse-connected to the clock signal line, and the first terminal is reverse-connected to the data signal line,
a first drive unit in the first plurality of drive units and a second drive unit in the second plurality of drive units are slave-connected to a host,
other drive units in the first plurality of drive units are slave-connected to the first drive unit, and
other drive units in the second plurality of drive units are slave-connected to the second drive unit.

2. The drive apparatus according to claim 1, wherein each of the first plurality of drive units and the second plurality of drive units is slave-connected to a host that is configured to function as a common controller configured to control the first drive unit group and the second drive unit group.

3. The drive apparatus according to claim 2, wherein
each of all drive units in the first plurality of drive units is connected to the host such that the first terminal is forward-connected to the clock signal line, and the second terminal is forward-connected to the data signal line, and
each of all drive units in the second plurality of drive units is connected to the host such that the second terminal is reverse-connected to the clock signal line, and the first terminal is reverse-connected to the data signal line.

4. The drive apparatus according to claim 2, wherein the at least one reverse-connected second plurality of drive units is configured to discriminate between a clock signal and a data signal and switch between an internal clock signal line and an internal data signal line and wherein the at least one reverse-connected second plurality of drive units is configured to be communicable as a slave different from the at least one forward-connected first plurality of drive units as viewed from the master.

5. The drive apparatus according to claim 4, wherein the at least one reverse-connected second plurality of drive units is configured to change its own slave address in accordance with switching between the internal clock signal line and the internal data signal line.

6. The drive apparatus according to claim 2, comprising the host, wherein
the common controller is configured to control at least either of the first drive unit group or the second drive unit group to drive at least either of the first object or the second object to a target position in the optical axis direction.

7. The drive apparatus according to claim 6, wherein when driving at least either of the first object or the second object to the target position, the common controller is configured to set a plurality of via points obtained by dividing a path to the target position, and execute the driving to each via point in the plurality of via points in a stepwise manner.

8. The drive apparatus according to claim 7, wherein when the target position is changed, the common controller is configured to drive at least either of the first object or the second object from a via point immediately after the change in the plurality of via points to the changed target position.

9. The drive apparatus according to claim 8, wherein the common controller is configured to be able to switch whether to execute the driving in a stepwise manner in accordance with an operation state of a system including the object.

10. The drive apparatus according to claim 9, wherein when driving at least either of the first object or the second object to a target position in the optical axis direction, the common controller is configured to set the plurality of via points obtained by dividing a path to the target position, and execute the driving to each via point in the plurality of via points in a stepwise manner.

11. The drive apparatus according to claim 10, wherein when the target position is changed, the common controller is configured to drive at least either of the first object or the second object from a via point immediately after the change in the plurality of via points to the changed target position.

12. The drive apparatus according to claim 1, wherein
the first drive unit is connected to the host such that the first terminal is forward-connected to a primary clock signal line, and the second terminal is forward-connected to a primary data signal line, and
the second drive unit is connected to the host such that the second terminal is reverse-connected to the primary clock signal line, and the first terminal is reverse-connected to the primary data signal line.

13. The drive apparatus according to claim 12, wherein
at least one of the other drive units in the first plurality of drive units is connected to the first drive unit such that the first terminal is forward-connected to a secondary first clock signal line, and the second terminal is forward-connected to a secondary first data signal line, and
at least one of the other drive units in the first plurality of drive units is connected to the first drive unit such that the second terminal is reverse-connected to the secondary first clock signal line, and the first terminal is reverse-connected to the secondary first data signal line.

14. The drive apparatus according to claim 13, wherein
at least one of the other drive units in the second plurality of drive units is connected to the second drive unit such that the first terminal is forward-connected to a secondary second clock signal line, and the second terminal is forward-connected to a secondary second data signal line, and
at least one of the other drive units in the second plurality of drive units is connected to the second drive unit such that the second terminal is reverse-connected to the secondary second clock signal line, and the first terminal is reverse-connected to the secondary second data signal line.

15. The drive apparatus according to claim 14, wherein the first drive unit and the second drive unit are configured to function as individual controllers that respectively control the drive unit groups to which the first drive unit and the second drive unit belong.

16. The drive apparatus according to claim 12 wherein the at least one reverse-connected second plurality of drive units is configured to discriminate between a clock signal and a data signal and switch between an internal clock signal line and an internal data signal line and wherein the at least one reverse-connected second plurality of drive units is configured to be communicable as a slave different from the at least one forward-connected first plurality of drive units as viewed from the master.

17. The drive apparatus according to claim 1, wherein
each of all the other drive units in the first plurality of drive units is connected to the first drive unit such that the first terminal is forward-connected to a secondary clock signal line, and the second terminal is forward-connected to a secondary data signal line, and
each of all the drive units in the second plurality of drive units is connected to the first drive unit such that the second terminal is reverse-connected to the secondary clock signal line, and the first terminal is reverse-connected to the secondary data signal line.

18. The drive apparatus according to claim 17, wherein the first drive unit is configured to function as a common controller that controls the first drive unit group and the second drive unit group.

19. A drive apparatus comprising:
a first drive unit group including a first plurality of drive units, each of which is configured to generate a magnetic field to drive a first object provided with a first lens and a first magnet in an optical axis direction; and
a second drive unit group including a second plurality of drive units, each of which is configured to generate a magnetic field to drive a second object provided with a second lens and a second magnet in the optical axis direction, wherein
each of the first plurality of drive units and the second plurality of drive units includes a first terminal and a second terminal that are connected via a clock signal line and a data signal line to a master that controls the drive unit as a slave,
in at least one drive unit in the first plurality of drive units, the first terminal is forward-connected to the clock signal line, and the second terminal is forward-connected to the data signal line,
in at least one drive unit in the second plurality of drive units, the second terminal is reverse-connected to the clock signal line, and the first terminal is reverse-connected to the data signal line,
a first drive unit in the first plurality of drive units is slave-connected to a host, and
other drive units in the first plurality of drive units and the second plurality of drive units are slave-connected to the first drive unit,
each of all other drive units in the first plurality of drive units is connected to the first drive unit such that the first terminal is forward-connected to a secondary clock signal line, and the second terminal is forward-connected to a secondary data signal line, and
each of all drive units in the second plurality of drive units is connected to the first drive unit such that the second terminal is reverse-connected to the secondary clock signal line, and the first terminal is reverse-connected to the secondary data signal line.

20. A drive apparatus comprising:
a first drive unit group including a first plurality of drive units, each of which is configured to generate a magnetic field to drive a first object provided with a first lens and a first magnet in an optical axis direction; and
a second drive unit group including a second plurality of drive units, each of which is configured to generate a magnetic field to drive a second object provided with a second lens and a second magnet in the optical axis direction, wherein each of the first plurality of drive units and the second plurality of drive units includes a first terminal and a second terminal that are connected via a clock signal line and a data signal line to a master that controls the drive unit as a slave, in at least one drive unit in the first plurality of drive units, the first terminal is forward-connected to the clock signal line, and the second terminal is forward-connected to the data signal line, in at least one drive unit in the second plurality of drive units, the second terminal is reverse-connected to the clock signal line, and the first terminal is reverse-connected to the data signal line, each of the first plurality of drive units and the second plurality of drive units is slave-connected to a host that is configured to function as a common controller configured to control the first drive unit group and the second drive unit group, and the common controller is configured to control at least either of the first drive unit group or the second drive unit group to drive at least either of the first object or the second object to a target position in the optical axis direction.

* * * * *